(12) United States Patent
Yee et al.

(10) Patent No.: US 9,898,675 B2
(45) Date of Patent: Feb. 20, 2018

(54) USER MOVEMENT TRACKING FEEDBACK TO IMPROVE TRACKING

(75) Inventors: Dawson Yee, Medina, WA (US);
Kathryn Stone Perez, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 22 days.

(21) Appl. No.: 12/820,954

(22) Filed: Jun. 22, 2010

(65) Prior Publication Data

US 2010/0277411 A1 Nov. 4, 2010

Related U.S. Application Data

(63) Continuation-in-part of application No. 12/434,553, filed on May 1, 2009, now Pat. No. 9,015,638.

(51) Int. Cl.
*G06F 3/00* (2006.01)
*G06K 9/32* (2006.01)
(Continued)

(52) U.S. Cl.
CPC ............. *G06K 9/32* (2013.01); *G06F 3/017* (2013.01); *G06F 3/0304* (2013.01); *G06K 9/00912* (2013.01)

(58) Field of Classification Search
CPC ..... A63F 2300/1087; A63F 2300/1093; G06F 3/04883; G06F 3/017
(Continued)

(56) References Cited

U.S. PATENT DOCUMENTS

| 4,627,620 A | 12/1986 | Yang |
| 4,630,910 A | 12/1986 | Ross et al. |

(Continued)

FOREIGN PATENT DOCUMENTS

| CN | 1648840 A | 8/2005 |
| CN | 1828630 A | 9/2006 |

(Continued)

OTHER PUBLICATIONS

Foody, "A Prototype Sourceless Kinematic-Feedback Based Video Game for Movement Based Exercise", Proceedings of the 28th IEEE Engineering in Medicine and Biology Society Annual International Conference, Aug. 30-Sep. 3, 2006, pp. 5366-5369, New York, USA.

(Continued)

*Primary Examiner* — Haoshian Shih
(74) *Attorney, Agent, or Firm* — Jacob P. Rohwer; Newport IP, LLC

(57) ABSTRACT

Technology is presented for providing feedback to a user on an ability of an executing application to track user action for control of the executing application on a computer system. A capture system detects a user in a capture area. Factors in the capture area and the user's actions can adversely affect the ability of the application to determine if a user movement is a gesture which is a control or instruction to the application. One example of such factors is a user being out of the field of view of the capture system. Some other factor examples include lighting conditions and obstructions in the capture area. Responsive to a user tracking criteria not being satisfied, feedback is output to the user. In some embodiments, the feedback is provided within the context of an executing application.

16 Claims, 15 Drawing Sheets

(51) Int. Cl.
*G06F 3/01* (2006.01)
*G06F 3/03* (2006.01)
*G06K 9/00* (2006.01)

(58) Field of Classification Search
USPC .............. 715/863; 345/156; 382/107, 154; 463/36–39
See application file for complete search history.

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,515,079 A | 5/1996 | Hauck |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A * | 1/1998 | Iwasaki et al. .............. 463/38 |
| 5,715,834 A | 2/1998 | Bergamasco et al. |
| 5,813,863 A * | 9/1998 | Sloane et al. .............. 434/236 |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,124,862 A | 9/2000 | Boyken et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,241,612 B1 | 6/2001 | Heredia |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,767,287 B1 | 7/2004 | Mcquaid et al. |
| 6,771,277 B2 | 8/2004 | Ohba |
| 6,784,901 B1 | 8/2004 | Harvey et al. |
| 6,788,809 B1 | 9/2004 | Grzeszczuk et al. |
| 6,801,637 B2 | 10/2004 | Voronka et al. |
| 6,809,726 B2 | 10/2004 | Kavanagh |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |

(56) References Cited

U.S. PATENT DOCUMENTS

| | | |
|---|---|---|
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,327,376 B2 | 2/2008 | Shen et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,483,049 B2 | 1/2009 | Aman et al. |
| 7,489,812 B2 | 2/2009 | Fox et al. |
| 7,536,032 B2 | 5/2009 | Bell |
| 7,536,034 B2 | 5/2009 | Rhoads et al. |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,577,925 B2 | 8/2009 | Zotov et al. |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,656,396 B2 | 2/2010 | Bosch et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,905,779 B2* | 3/2011 | Dyke et al. .................. 463/30 |
| 8,004,503 B2 | 8/2011 | Zotov et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,111,239 B2* | 2/2012 | Pryor et al. .................. 345/156 |
| 8,127,236 B2* | 2/2012 | Hamilton et al. ............ 715/757 |
| 8,139,110 B2 | 3/2012 | Nishihara |
| 8,230,367 B2* | 7/2012 | Bell et al. .................... 715/863 |
| 8,294,105 B2* | 10/2012 | Alameh et al. ............... 250/344 |
| 2002/0075334 A1 | 6/2002 | Yfantis |
| 2002/0126090 A1* | 9/2002 | Kirkpatrick et al. ......... 345/158 |
| 2003/0003991 A1 | 1/2003 | Kuraishi |
| 2003/0218761 A1* | 11/2003 | Tomasi et al. ............... 356/627 |
| 2004/0005924 A1* | 1/2004 | Watabe et al. ............... 463/36 |
| 2004/0155962 A1 | 8/2004 | Marks |
| 2004/0178994 A1 | 9/2004 | Kairls, Jr. |
| 2004/0179038 A1* | 9/2004 | Blattner et al. .............. 345/751 |
| 2004/0207597 A1 | 10/2004 | Marks |
| 2005/0059488 A1 | 3/2005 | Larsen et al. |
| 2005/0183035 A1 | 8/2005 | Ringel et al. |
| 2005/0215319 A1 | 9/2005 | Rigopulos et al. |
| 2006/0035710 A1 | 2/2006 | Festejo et al. |
| 2006/0046847 A1* | 3/2006 | Hashimoto ................... 463/36 |
| 2006/0110008 A1* | 5/2006 | Vertegaal et al. ............ 382/103 |
| 2006/0154725 A1* | 7/2006 | Glaser et al. ................. 463/37 |
| 2006/0188144 A1 | 8/2006 | Sasaki et al. |
| 2006/0239558 A1 | 10/2006 | Rafii et al. |
| 2006/0258427 A1 | 11/2006 | Rowe et al. |
| 2007/0013718 A1 | 1/2007 | Ohba |
| 2007/0060336 A1 | 3/2007 | Marks et al. |
| 2007/0060383 A1* | 3/2007 | Dohta ........................... 463/43 |
| 2007/0098222 A1 | 5/2007 | Porter et al. |
| 2007/0120834 A1* | 5/2007 | Boillot .................... G06F 3/016 345/173 |
| 2007/0178973 A1 | 8/2007 | Camhi |
| 2007/0195067 A1 | 8/2007 | Zotov et al. |
| 2007/0200927 A1* | 8/2007 | Krenik ......................... 348/47 |
| 2007/0216894 A1 | 9/2007 | Garcia et al. |
| 2007/0218994 A1* | 9/2007 | Goto et al. ............. A63F 13/06 463/36 |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0030460 A1 | 2/2008 | Hildreth et al. |
| 2008/0040692 A1 | 2/2008 | Sunday et al. |
| 2008/0062257 A1 | 3/2008 | Corson |
| 2008/0081701 A1 | 4/2008 | Shuster |
| 2008/0100620 A1 | 5/2008 | Nagai et al. |
| 2008/0113767 A1 | 5/2008 | Nguyen et al. |
| 2008/0126937 A1 | 5/2008 | Pachet |
| 2008/0134102 A1 | 6/2008 | Movold et al. |
| 2008/0141181 A1* | 6/2008 | Ishigaki et al. .............. 715/863 |
| 2008/0146302 A1* | 6/2008 | Olsen et al. .................. 463/7 |
| 2008/0152191 A1 | 6/2008 | Fujimura et al. |
| 2008/0200287 A1* | 8/2008 | Marty et al. .................. 473/459 |
| 2008/0215972 A1 | 9/2008 | Zalewski et al. |
| 2008/0215973 A1 | 9/2008 | Zalewski et al. |
| 2008/0244468 A1 | 10/2008 | Nishihara et al. |
| 2008/0261693 A1 | 10/2008 | Zalewski |
| 2008/0274804 A1* | 11/2008 | Harrison et al. ............. 463/29 |
| 2009/0005141 A1 | 1/2009 | Lehtiniemi et al. |
| 2009/0027337 A1 | 1/2009 | Hildreth |
| 2009/0063307 A1* | 3/2009 | Groenovelt et al. ......... 705/28 |
| 2009/0077504 A1 | 3/2009 | Bell et al. |
| 2009/0085864 A1 | 4/2009 | Kutliroff et al. |
| 2009/0133051 A1 | 5/2009 | Hildreth |
| 2009/0138805 A1* | 5/2009 | Hildreth ....................... 715/745 |
| 2009/0141933 A1 | 6/2009 | Wagg |
| 2009/0167679 A1 | 7/2009 | Klier et al. |
| 2009/0183125 A1* | 7/2009 | Magal et al. ................. 715/863 |
| 2009/0209343 A1 | 8/2009 | Foxlin et al. |
| 2009/0221368 A1 | 9/2009 | Yen et al. |
| 2009/0221374 A1* | 9/2009 | Yen et al. ..................... 463/42 |
| 2009/0228841 A1 | 9/2009 | Hildreth |
| 2009/0237490 A1* | 9/2009 | Nelson, Jr. ................... 348/43 |
| 2009/0270169 A1* | 10/2009 | Kondo ......................... 463/31 |
| 2009/0298650 A1 | 12/2009 | Kutliroff |
| 2009/0313584 A1* | 12/2009 | Kerr et al. .................... 715/849 |
| 2009/0319459 A1 | 12/2009 | Breazeal et al. |
| 2010/0039500 A1 | 2/2010 | Bell et al. |
| 2010/0053304 A1* | 3/2010 | Underkoffler et al. ......... 348/42 |
| 2010/0220064 A1 | 9/2010 | Griffin et al. |
| 2010/0235786 A1* | 9/2010 | Maizels et al. ............... 715/810 |
| 2011/0009194 A1* | 1/2011 | Gabai et al. .................. 463/36 |
| 2011/0225534 A1 | 9/2011 | Wala |
| 2011/0306397 A1* | 12/2011 | Fleming et al. ............... 463/7 |
| 2011/0306398 A1* | 12/2011 | Boch et al. ................... 463/7 |

FOREIGN PATENT DOCUMENTS

| | | |
|---|---|---|
| CN | 101206715 A | 6/2008 |
| CN | 101254344 B | 6/2010 |
| EP | 0583061 A2 | 2/1994 |
| JP | 08044490 A1 | 2/1996 |
| JP | H10207619 A | 8/1998 |
| JP | 11272293 A | 10/1999 |
| JP | 2003030686 A | 1/2003 |
| JP | 2007241797 A | 9/2007 |

(56) References Cited

FOREIGN PATENT DOCUMENTS

| | | | |
|---|---|---|---|
| JP | 2007267858 A | 10/2007 | |
| JP | 2008052590 A | 3/2008 | |
| JP | 2009535167 A | 10/2009 | |
| JP | 2010059465 A | 3/2010 | |
| JP | 2010082386 A | 4/2010 | |
| JP | 2011189066 A | 9/2011 | |
| TW | I316196 B | 10/2009 | |
| WO | 93/10708 A1 | 6/1993 | |
| WO | 97/17598 A1 | 5/1997 | |
| WO | 9915863 A1 | 4/1999 | |
| WO | 99/44698 A1 | 9/1999 | |
| WO | 0159975 A3 | 1/2002 | |
| WO | 02082249 A2 | 10/2002 | |
| WO | 03001722 A3 | 3/2003 | |
| WO | 03046706 A1 | 6/2003 | |
| WO | 03073359 A3 | 11/2003 | |
| WO | 03054683 A3 | 12/2003 | |
| WO | 03071410 A3 | 3/2004 | |
| WO | 2008049151 | 5/2008 | |
| WO | 2009059065 A1 | 5/2009 | |

OTHER PUBLICATIONS

Charbonneau, "Poster: RealDance An Exploration of 3D Spatial Interfaces for Dancing Games", IEEE Symposium on 3D User Interfaces, Mar. 14-15, 2009, pp. 141142, Lafayette, LA, USA.

Jää-Aro, "Reconsidering the Avatar: From User Mirror to Interaction Locus", Doctoral Thesis, Mar. 2004, pp. 1-170, Stockholm, Sweden.

Höllerer, "User Interface Management Techniques for Collaborative Mobile Augmented Reality", Computers and Graphics, Oct. 2001, pp. 799-810, vol. 25, No. 5, Elsevier Science Ltd.

U.S. Appl. No. 12/788,731, filed May 27, 2010.

Office Action dated May 22, 2012, U.S. Appl. No. 12/788,731, filed May 27, 2010.

Toyama, Kentaro, et al., "Probabilistic Tracking in a Metric Space," Eighth International Conference on Computer Vision, Vancouver, Canada, vol. 2, Jul. 2001, 8 pages.

Amendment filed Oct. 22, 2012, U.S. Appl. No. 12/788,731, filed May 27, 2010.

Office Action dated Dec. 19, 2012, U.S. Appl. No. 12/788,731, filed May 27, 2010.

Response to Office Action dated Mar. 19, 2013, U.S. Appl. No. 12/788,731, filed May 27, 2010.

Amendment dated May 29, 2014, in Chinese Patent Appl. No. 201110150690.5 filed May 26, 2011.

Office Action dated Apr. 30, 2014, in U.S. Appl. No. 12/788,731, filed May 27, 2010.

Amendment dated Jan. 11, 2013, in Chinese Patent Appl. No. 201110150690.5 filed May 26, 2011.

Office Action dated Mar. 14, 2014, in Chinese Patent Appl. No. 201110150690.5 filed May 26, 2011.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transctions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Gedikili et al., "An Adaptive Vision System for Tracking Soccer Players from Variable Camera Settings," Intelligent Autonomous Systems Group, 10 pages, downloaded at htlp://www9.cs.tum.edu/papers/pdf/gedikli07adaptive.pdf on Feb. 10, 2009.

"Slots and Video Gaming," International Game Technology, 2005, pp. 1-86, downloaded at http://media.igt.com/Marketing/PromotionalLiterature/IntroductionToGaming.pdf.

"Larry Kless's Weblog," Dec. 2008, pp. 1-99, downloaded at http://klessblog.blogspot.com/2008_12_01_archive.html.

(56) References Cited

OTHER PUBLICATIONS

Kane, B., "Postcard from Siggraph 2005: Beyond the Gamepad," Think Services, Aug. 19, 2005, pp. 1-5, downloaded at http://www.gamasutra.com/view/feature/2378/postcard_from_siggraph_2005_php.
Feng, W., "What's Next for Networked Games?" NetGames 2007 keynote talk, Sep. 19-20, 2007, 74 pages, downloaded at http://www.thefengs.com/wuchang/work/cstrike/netgames07_keynote.pdf.
Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.
Morris et al., Beyond Social Protocols: Multi-User Coordination Policies for Co-located Groupware, Mitsubishi Electric Research Laboratories, Jan. 2004.
PCT Application No. PCT/US20101032975 : International Search Report and Written Opinion of the International Searching Authority, Jan. 7, 2011, 8 pages.
Ahn et al., "Large Display Interaction using Video Avatar and Hand Gesture Recognition", Imaging Media Research Center, KIST, Sep. 2004, 8 pages.
Golomidov, "Human Detect Ion in Video", Apr. 18, 2008, 13 pages.
Karaulova et al., "A Hierarchical Model of Dynamics for Tracking People with a Single Video Camera", Sep. 2000, 10 pages.
Kartz et al., "On Hand Tracking & Gesture Recognition", Wiizards: 3D Gesture Recognition for Game Play, www.krd-haptics.blogspot.com-2008-03-wiizards-3d-gesture-recognition-forhtml, Mar. 19, 2008, 1-2.
Manninen, "Interaction Manifestations in Multi-player Games", Being There: Concepts, effects and measurement of user presence in synthetic environments, Chapter 20, Amsterdam, The Netherlands, Apr. 2003, 10 pages.
Morris et al., "Cooperative Gestures: Multi-User Gestural Interactions for Co-located Groupware", CHI 2006, Apr. 22-28, 2006, 10 pages.
Pers et al., "Computer Vision System for Tracking Players in Sports Games", First Int'l Workshop on Image and Signal Processing and Analysis, Pula, Croatia, Jun. 14-15, 2000, 6 pages.
Office Action dated Jul. 2, 2013, in Chinese Patent Appl. No. 201110150690.5 filed Dec. 19, 2007.
Amendment dated Dec. 29, 2014, in U.S. Appl. No. 12/788,731, filed May 27, 2010.
Office Action dated Aug. 12, 2014, in Chinese Patent Appl. No. 201110150690.5 filed May 26, 2011.
Amendment dated Oct. 27, 2014, in Chinese Patent Appl. No. 201110150690.5 filed May 26, 2011.
Amendment dated Sep. 2, 2014, in U.S. Appl. No. 12/788,731, filed May 27, 2010.
Office Action dated Sep. 29, 2014, in U.S. Appl. No. 12/788,731, filed May 27, 2010.
Response to Office Action, and partial English translation, filed May 15, 2015 in Chinese Patent Application No. 201180030882.0.
Response to Office Action filed Jun. 2, 2015 in U.S. Appl. No. 12/788,731.
"First Office Action and Search Report Received for Chinese Patent Application No. 201180030882.0", and partial translation, Mailed Date: Jan. 14, 2015, 17 pages. (MS# 329360.05).
"Office Action Received for Japanese Patent Application No. 2013-516608", and partial English translation, Mailed Date: May 20, 2015, 11 pages. (MS# 329360.07).
Office Action dated Jan. 14, 2015, in Chinese Patent Appl. No. 201180030882.0 filed Jun. 14, 2011.
Office Action dated Mar. 4, 2015, in U.S. Appl. No. 12/788,731, filed May 27, 2010.
Voluntary Submission of Information dated Mar. 30, 2015, in Canadian Patent Appl. No. 2,800,538 filed Jun. 14, 2011.
Office Action dated Feb. 15, 2015, in Chinese Patent Appl. No. 201110150690.5 filed May 26, 2011.
Response to Office Action, with partial English translation, filed May 4, 2015 in Chinese Patent Appl. No. 201110150690.5 filed May 26, 2011.
Fifth Office Action dated Jul. 31, 2015 in Chinese Patent Application No. 201110150690.5, with partial English Translation.
Response to Office Action filed Aug. 5, 2015 in Japanese Patent Application No. 2013-516608, and partial English translation.
"Office Action and Search Report Received for Taiwan Patent Application No. 100117828", Mailed Date: Sep. 7, 2015, 11 Pages. (MS# 329360.03).
"Second Office Action Received for Chinese Patent Application No. 201180030882.0", Mailed Date: Sep. 11, 2015, 12 Pages. (MS# 329360.05).
"Office Action Issued in Japanese Patent Application No. 2013-516608", Mailed Date: Nov. 16, 2015, 8 Pages. (MS# 329360.07).
"Third Office Action Issued in Chinese Patent Application No. 201180030882.0", Mailed Date: Feb. 1, 2016, 7 Pages. (MS# 329360.05).
Office Action dated Sep. 25, 2015 in U.S. Appl. No. 12/788,731.
Response to Office Action filed Oct. 28, 2015 in Chinese Patent Application No. 2011800308820, and partial English translation.
Response to Office Action filed Oct. 14, 2015 in Chinese Patent Application No. 2011101506905, and partial English translation.
"Office Action and Search Report Issued in Taiwan Patent Application No. 100117828", Mailed Date: Feb. 23, 2016, 15 Pages.
"Office Action Issued in European Patent Application No. 11798639.8", Mailed Date: Mar. 18, 2016, 6 Pages.
"Supplementary Search Report Issued in European Patent Application No. 11798639.8", Mailed Date: Feb. 24, 2016, 3 Pages.
Response to Office Action tiled Jan. 13, 2016, with English translation of claims as amended, in Taiwan Patent Application No. 100117828, 19 pages.
Response to Office Action tiled Feb. 1, 2016, with English translation of claims as amended, in Japanese Patent Application No. 2013-516608, 12 pages.
Office Action, with partial English translation, mailed Feb. 19, 2016 in Chinese Patent Application No. 201110150690.5, 6 pages.
Response to Office Action, with partial English translation, tiled Mar. 22, 2016 in Chinese Patent Application No. 201180030882.0, 80 pages.
Notice of Allowance dated Apr. 25, 2016 in Japanese Patent Application No. 2013-516608, 4 pages.
Notice of Allowance dated Apr. 13, 2016 in Chinese Patent Application No. 201180030882.0, 10 pages.
"Office Action Issued in Taiwan Patent Application No. 100117828", with English language Summary of Office Action, Mailed Date: Nov. 8, 2016, 4 Pages.
"Office Action Issued in Canadian Patent Application No. 2,800,538", Mailed Date: Jan. 12, 2017, 6 Pages.
Response to Office Communication filed Apr. 22, 2016 in European Patent Application No. 11 798 639.8, 14 pages.
Summons to attend oral proceedings in European Patent Application No. 11798639.8, dated Nov. 28, 2016, 6 pages.
Response to Summons to attend oral proceedings in European Patent Application No. 11798639.8, filed Aug. 23, 2017, 29 pages.
"Office Action Issued in Canadian Patent Application No. 2800538", dated Sep. 6, 2017, 9 Pages.
Response to Summons to attend oral proceedings in European Patent Application No. 11798639.8, filed Sep. 28, 2017, 19 pages.

* cited by examiner

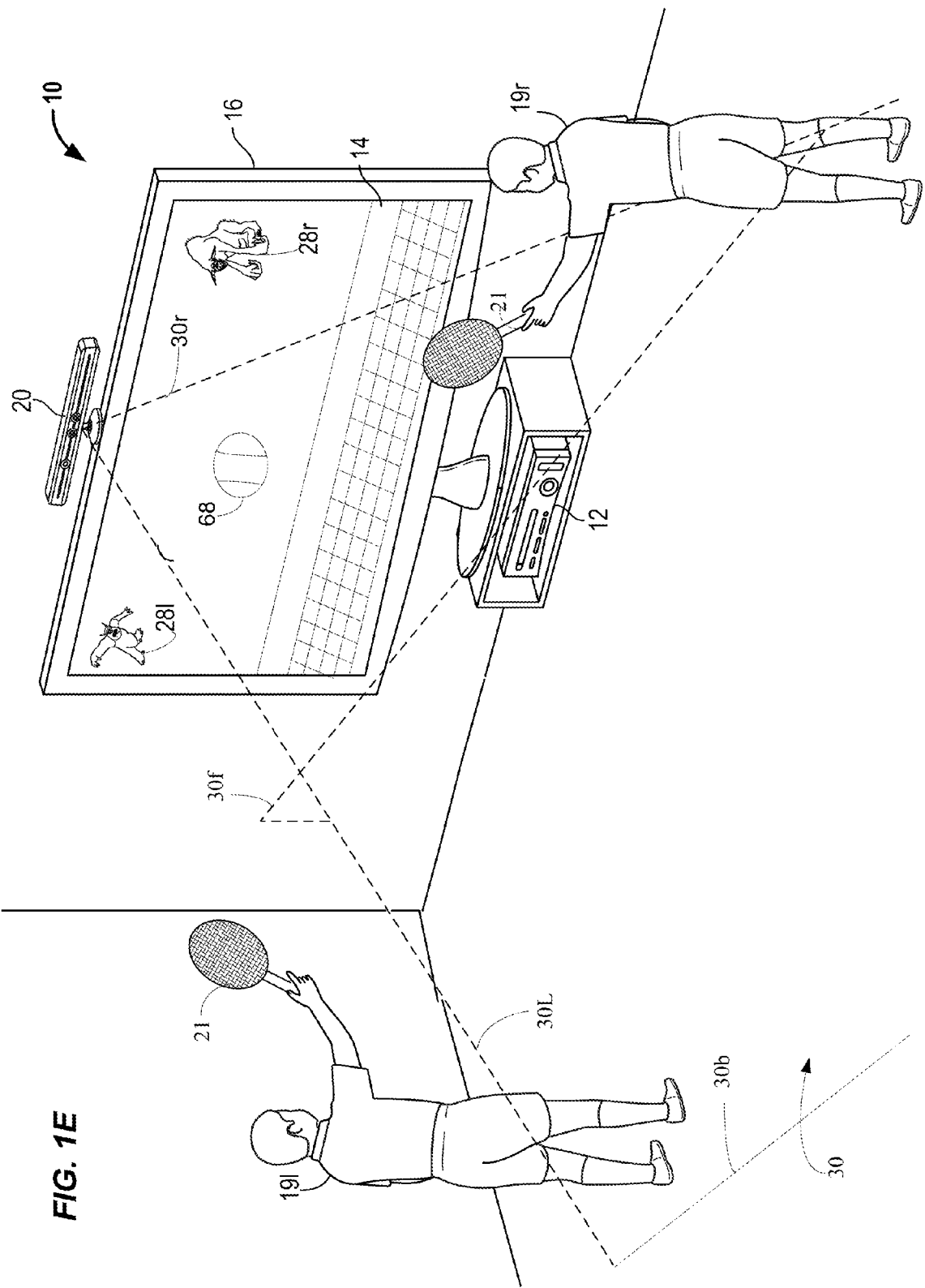

USER MOVEMENT TRACKING FEEDBACK TO IMPROVE TRACKING

CROSS REFERENCE TO RELATED APPLICATION

This application claims priority as a continuation-in-part of U.S. patent application Ser. No. 12/434,553 entitled "Binding Users to a Gesture Based System and Providing Feedback to the Users," having inventors Alex Kipman, Kathryn Stone Perez, R. Stephen Polzin, and William Guo, filed on May 1, 2009 and which is hereby specifically incorporated by reference herein.

U.S. patent application Ser. No. 12/788,731 entitled "Active Calibration of a Natural User Interface," having inventor Kenneth Lobb, filed May 27, 2010, is hereby specifically incorporated by reference herein.

BACKGROUND

In a typical computing environment, a user has an input device such as a keyboard, a mouse, a joystick or the like, which may be connected to the computing environment by a cable, wire, wireless connection, or some other means of connection. If control of the computing environment were to be shifted from a connected controller to gesture based control, particularly as in a natural user interface (NUI), the user no longer has a connected device to inform the computing environment of a control instruction for the application with great consistency.

For example, when a computing environment has a set input such as a controller or keyboard, a user can determine that he has a controller connected to a port, that he is pressing keys or buttons and that the system is responding. When control over the computing environment is shifted to gestures of a user, detecting gestures can be inhibited or produce sub-optimal response from the application due to visual or audio characteristics of the capture area or the user's body movements unlike with a controller. The inability to properly detect gestures can frustrate the user in interacting with an executing application. For example, his participation in a game being executed by the application may be frustrated.

SUMMARY

Technology is presented for providing feedback to a user on an ability of an executing application to track user action for control of the executing application on a computer system. A capture system detects a user in a capture area. Responsive to a user tracking criteria not being satisfied, feedback is output to the user. In some examples, the feedback can be an audio indicator. In other examples, visual indicators are provided as feedback to recommend an action for the user to take to satisfy the tracking criteria. In some embodiments, the feedback is provided within the context of an executing application. In one embodiment, technology is presented for assisting a user in selecting a capture area. Additionally, selection of a feedback response can be determined according to criteria in some embodiments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1E illustrates an example of visual indicators which can inform a user when he is too close or outside of a boundary.

DETAILED DESCRIPTION

Technology is presented for providing feedback to a user on an ability of an executing application to track user action for control of the executing application on a computer system. One example of a distinguishability factor which can affect the ability to track a user is when a body part of the user which controls a display object is at least partially out of a field of view of an image capture system. Other factors include ambient factors such as lighting effects, certain types of obstructions and audio factors such as loudness and distinguishability of speech (e.g. syllables or words).

In some embodiments, the technology presents feedback responses that are explicit suggestions to a user. In other embodiments, the feedback is subtle or implicit by being provided within the context of an executing application. For example, when a user is too close to a border of a field of view of a capture system, an object such as a scary monster within a scene comes on the display side near that border. A user is motivated to move away from the field of view border towards the center of the field of view to escape the monster.

Examples of factors upon which selection of a feedback response can be determined are discussed further below.

Figure 1A:
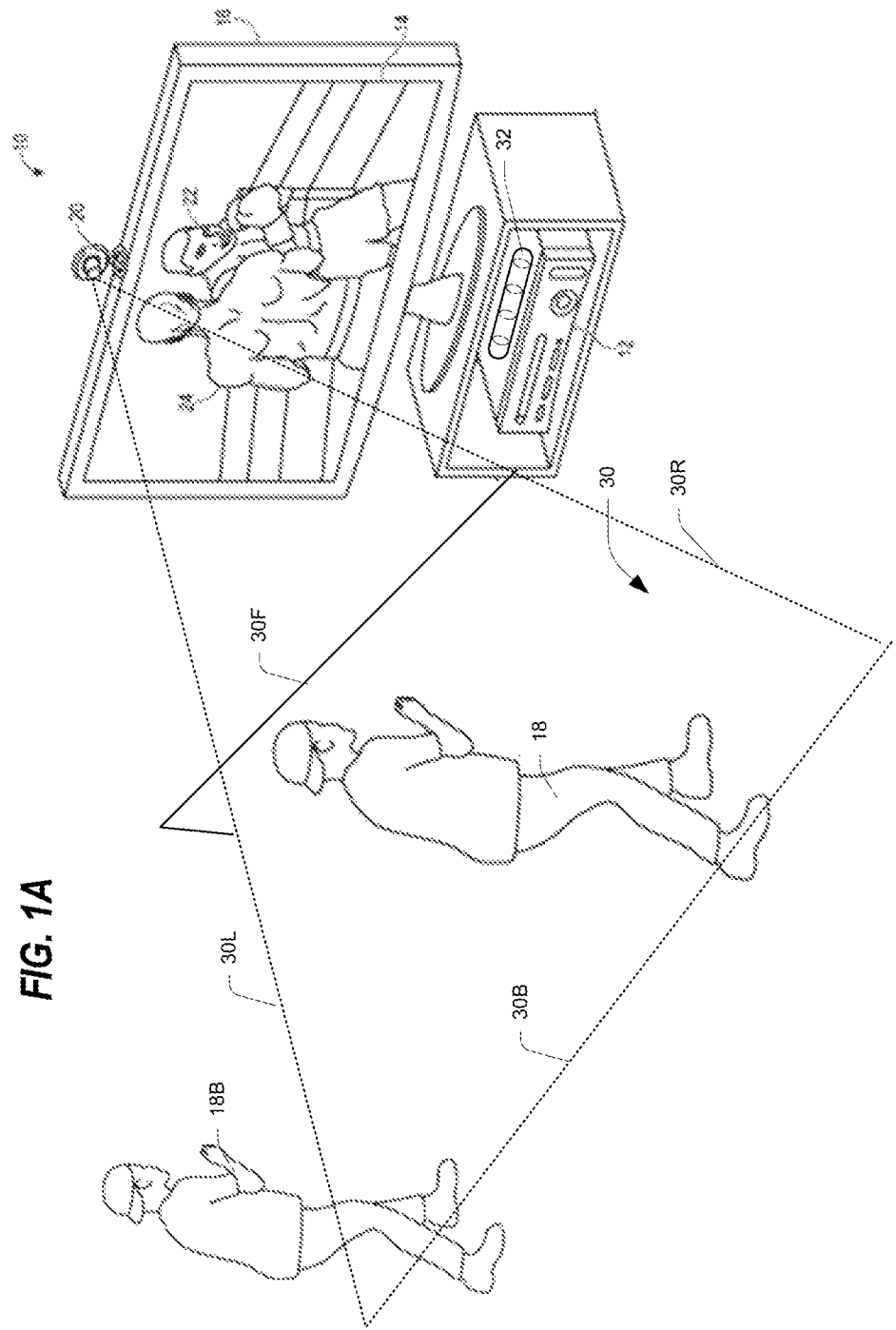
FIG. 1A illustrates an example embodiment of a target recognition, analysis, and tracking system in which technology embodiments for providing user feedback can operate.

FIG. 1A illustrates an example embodiment of a target recognition, analysis, and tracking system 10 with a user 18 playing a game in which technology embodiments for providing user feedback can operate. In this example, the target recognition, analysis, and tracking system 10 recognizes human beings in their natural environment, without special sensing devices attached to the subjects, uniquely identifies them and tracks them in three dimensional space. However, the technology can be applicable to other user tracking mechanisms such as a sensor based system in which a user wears sensors.

According to the example embodiment, the target may be a human target (e.g. user 18), a human target with an object, two or more human targets, or the like that may be scanned to generate a model such as a skeletal model, a mesh human model, or any other suitable representation thereof. The model may be tracked such that physical movements or motions of the target may act as a real-time user interface that adjusts and/or controls parameters of an application. Furthermore, the model can be presented to applications as a model and delivered to them in real-time. For example, the tracked motions of a user may be used to move an on-screen character or avatar in an electronic role-playing game.

In one example in which the model is a multi-point skeletal model, target recognition, analysis, and tracking system 10 efficiently tracks humans and their natural movements based on the natural mechanics and capabilities of the human muscular-skeletal system. The example system 10 also uniquely recognizes individuals in order to allow multiple people to interact with the system via natural movements of their limbs and body.

Movements of a user can be tracked to an avatar which can be a computer-generated image which represents a user who is typically a human. The avatar can depict an image of the user that is highly representative of what the user actually looks like or it may be a character (e.g. human, fanciful, animal, animated object) with varying degrees of resemblance to the user or none at all.

Specifically, FIG. 1A, illustrates an example embodiment of a configuration of a target recognition, analysis, and tracking system 10 with a user 18 playing a boxing game. In this example, software executing on a computer system 12 which controls or interacts with software on other computer systems of the communicatively coupled camera system 20 and audiovisual display unit 16 tracks the movements of user 18 based on the captured image data and analyzes them for instructions as the user's motions directly control the actions of his associated avatar in real-time. Thus, in this example, the user 18 may move his body to control his avatar 24 on the display screen 14 in the boxing game against his opponent avatar 22.

The audiovisual display system 16 can be an advanced display system such as a high-definition television (HDTV). In other embodiments, the display may be a lower resolution display, some examples of which include a television, a computer monitor, or mobile device display. The audiovisual system 16 may receive the audiovisual signals from the computing system 12 over a communication interface (e.g. an S-Video cable, a coaxial cable, an HDMI cable, a DVI cable, a VGA cable) and may then output the game or application visuals and/or audio associated with the audiovisual signals to the user 18.

A gesture comprises a motion or pose that acts as user input to control an executing application. Through moving his body, a user may create gestures. For example, a user may be captured in image data. An identified gesture of the user can be parsed for meaning as a control for an application or action to be performed. For example, the user 18 throws a jab in the boxing game of FIG. 1A. The game application represents it in the boxing match, determines whether it makes contact on avatar 22 and increases the user's score if it does. A gesture may be a static pose, such as holding one's crossed forearms in front of his torso or it may be one or more movements. Furthermore, a gesture may comprise more than one body part, such as clapping the hands together.

For example, the target recognition, analysis, and tracking system 10 may be used to recognize and analyze a punch of the user 18 in the capture area 30 such that the punch may be interpreted as a gesture, in this case a game control of a punch for his player avatar 24 to perform in game space. Other gestures by the user 18 may also be interpreted as other controls or actions, such as controls to bob, weave, shuffle, block, jab, or throw a variety of different power punches. By tracking the punches and jabs of user 18, the boxing game software application determines his avatar's 24 score and which avatar (22 or 24) will win the match. Different applications will recognize and track different gestures. For example, a pitch by a user in a baseball game is tracked in order to determine whether it is a strike or a ball.

According to other example embodiments, the gesture based system 10 may further be used to interpret target movements as operating system and/or application controls that are outside the realm of games. For example, virtually any controllable aspect of an operating system and/or application may be controlled by movements of the target such as the user 18.

The camera system 20 captures image data of the user in a capture area 30 within the field of view of the camera system 20. In this example, the capture area 30 in the field of view of the camera system 20 is a trapezoid 30, which from a user's perspective, has a shorter line 30f as the front of the capture area, a back line 30b (e.g. a wall can form this line) and a left side 30l and a right side 30r. The field of view can have different geometries. For example, the boundaries and obstructions of a capture area can effect its geometry. For example, if the users were playing in a gymnasium, a back wall may be much further back so the field of view is more cone shaped than trapezoidal. In other instances, a lens type of the camera can effect the field of view as well.

In FIG. 1A, the user is shown at a previous or before position 18b at which part of his body is outside the capture area 30 on the left boundary 30l. The position of user 18 is at his current position closer to the center of the capture area 30 and the camera's field of view. As will be discussed in further detail below, feedback in the context of the application was provided to suggest to the user or motivate the user to move to his right. The position of the other avatar 22 may have been moved to the right on the screen so that the user 18 needed to move in order to punch him. In another example, the perspective of the displayed view can have been changed from a left perspective to a right perspective view of the opponent avatar 22. In the right perspective view, if the user 18 remains at position 18b, his avatar will block the view of his opponent avatar 22. This action encourages user 18 to move to the right to better see his opponent avatar 22.

One or more off-screen display elements can also be used to provide user tracking feedback. In the illustrated example, a display light 32 such as a light emitting diode (LED) can be satisfied with a particular user. For example, different colors can be used to show tracking quality. Yellow can be a warning; green can be satisfactory; red can indicate a problem. In another example, different lighting patterns can indicate tracking quality. For example, each light can be associated with a boundary on the field of view. If a light element goes a certain color, the color may comprise is feedback that a user is too close to the boundary.

Figure 1B:
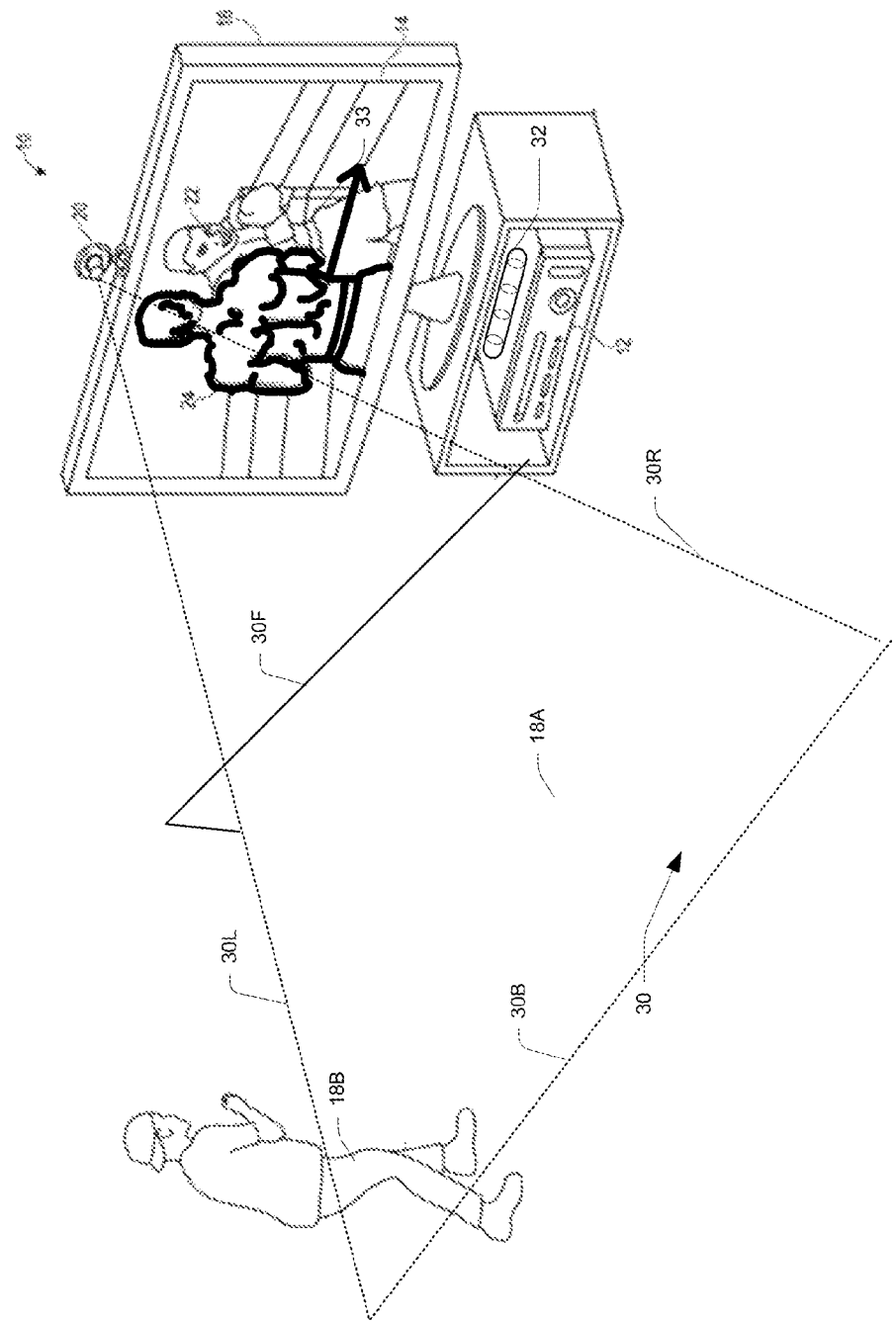
FIG. 1B illustrates another example of a user tracking feedback response for suggesting an action for the user to take to satisfy tracking criteria.

FIG. 1B illustrates another example of a user tracking feedback response for suggesting an action for the user to take to satisfy tracking criteria. Changing an appearance of an avatar can be used to inform a user of a tracking problem. Avatar 24 is highlighted in this example. Furthermore, explicit feedback in the form of arrow 33 is an example of a visual indicator. In this example, the feedback recommends the user associated with avatar 24 move right. These visual indicators are examples of application independent user tracking feedback as they are not tied to the context of the application.

The context of an application comprises the activity which is the purpose of the application. For example, in a menu user interface application, opening or closing a file would be contextual to the application. Avatars and scene objects moving according to the action of a game are contextual to the game. Some examples of actions that are contextual in a gaming application are throwing a punch, the arrival of a new enemy or monster as an obstacle, where a ball is thrown or caught, a change in the scenery as an avatar or user's view moves through a virtual environment, or a change of direction or perspective of a user's view of the game action.

Figure 1C:
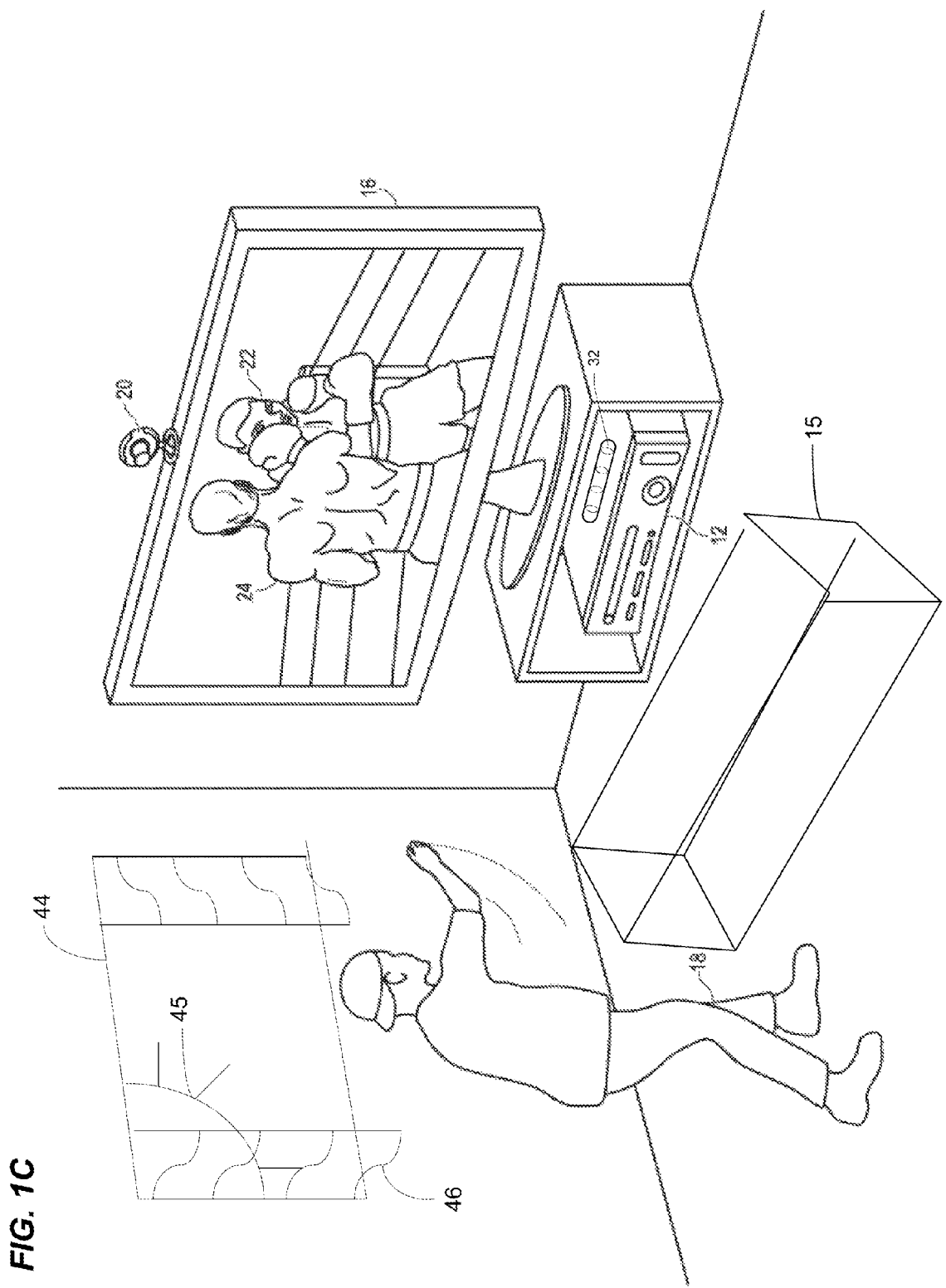
FIG. 1C illustrates some examples of visibility factors.

FIG. 1C illustrates some examples of visibility factors. The sunlight 45 coming through window 44 can cause ambient lighting to be a visibility issue for the camera system 20. A light meter of the image capture system 20 can indicate the user is getting washed out in the image data. Alternatively, it could be too dark.

Coffee table 15 is an example of an obstruction that can block a user's body part. The boxing game can have difficulty detecting the "shuffle" gesture in boxing due to the user's 18 legs being partially obscured by the coffee table.

Figure 1D:
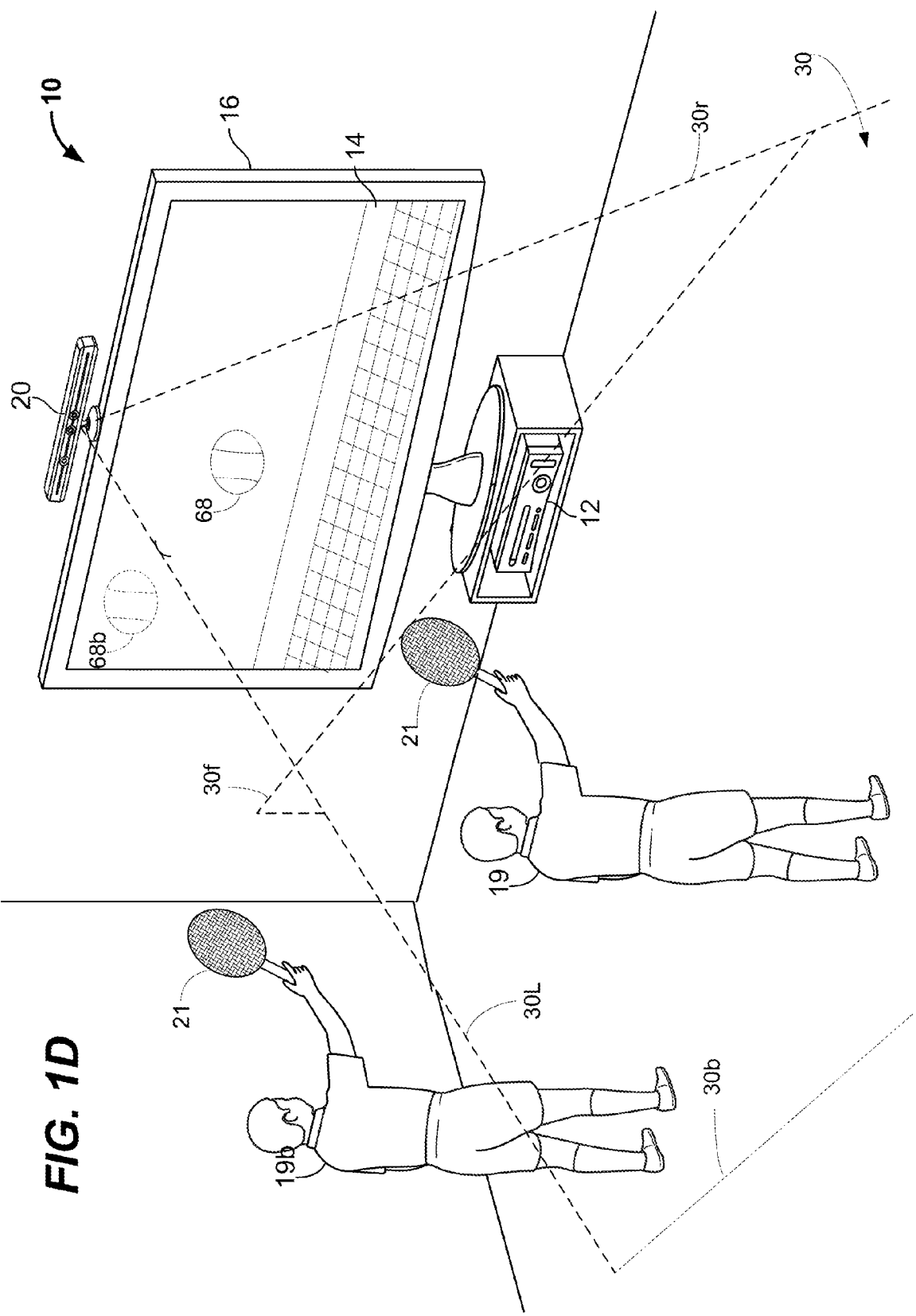
FIG. 1D illustrates another embodiment in which a user holding an object interacts with an embodiment of a target recognition, analysis, and tracking system.

FIG. 1D illustrates another embodiment in which a user holding an object interacts with an example embodiment of a target recognition, analysis, and tracking system 10. In such embodiments, the user 19 of an electronic game may be holding the object such that the motions of the user 19 and the object 21 may be used to adjust and/or control parameters of the game, such as, for example, hitting an onscreen ball 68. In other examples, the motion of a user holding a racket 21 may be tracked and utilized for controlling an on-screen racket in an electronic sports game. In another example embodiment, the motion of a user holding an object may be tracked and utilized for controlling an on-screen weapon in an electronic combat game. Any other object may also be included, such as one or more gloves, balls, bats, clubs, guitars, microphones, sticks, pets, animals, drums and the like.

FIG. 1D illustrates another example of using feedback in the context of an application to provide suggestion or motivation to a user to move to a better position within the field of view of the camera system 20. The user at position 19b has moved too far left with respect to the camera so that his upper body including his right arm and racket 21 are outside the left boundary 30l of the field of view. A previous incoming ball 68b had been displayed on the screen's upper left corner. The executing application for this game places the next incoming ball 68 in the middle of the display to motivate user 19 to move to the center of the field of view covering capture area 30 which he 19 has done as illustrated in his current position 19.

It should be recognized that FIG. 1D presents an alternative wherein a depiction of the user is not rendered on screen. In FIG. 1D, the user may be playing tennis in the first person, seeing the ball rendered on the screen and, in one example, all or a portion of the racquet hitting the ball, but no avatar of the user is rendered on the screen or only a portion of body parts of the user are rendered.

FIG. 1E illustrates an example of visual indicators which can inform a user when he is too close or outside of a boundary. Particularly for a very young child user, the display objects 28l (for left boundary issues) and 28r (for right boundary issues) can be feedback to inform the user to move back towards the center of the field of view. Similar visual indicators can be used with the front and back boundaries as well. Optionally, a sound can be associated with each visual indicator as it appears or after a certain number of boundary infractions.

Figure 1F:
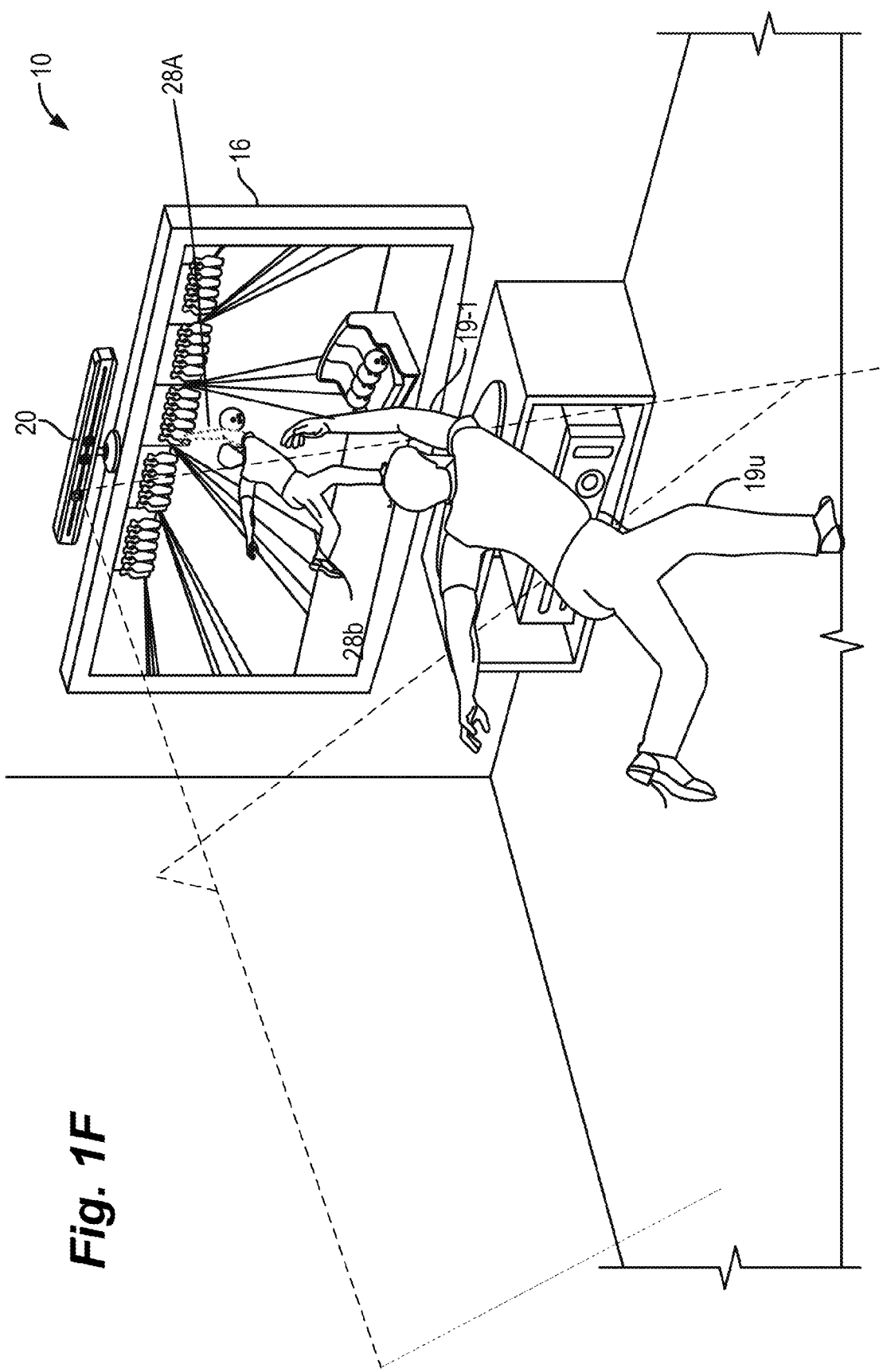
FIGS. 1F and 1G illustrate additional examples of visual indicators informing a user that they are outside a field of view of a capture device.

FIG. 1F illustrates another example of a visual indicator where a user 19u is playing a bowling game and an arm 19-1 of the user moves outside of the field of view. In the on-screen depiction 28b, the user's arm 28A is faded to show the user that the arm is outside the field of view of the camera. Other alternatives for changing the onscreen apparent of the user or elements the user is participating in including changing the color of all or a portion of the onscreen representation of the user, changing the focus of the depiction of the user (e.g. making the on-screen representation blurry or faded).

Figure 1G:
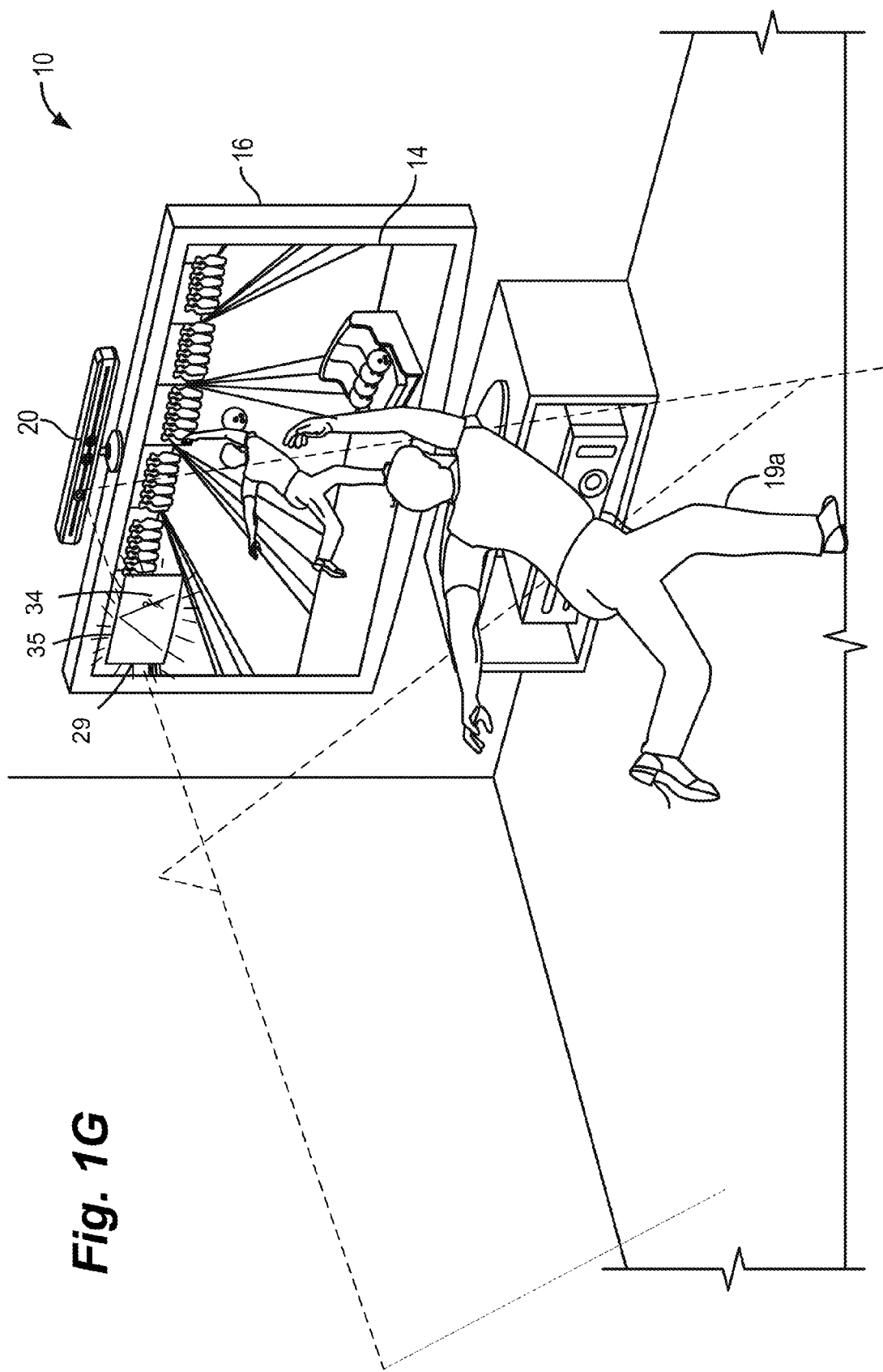

Still another example is shown in FIG. 1G has a warning graphic 29 illustrated in the upper left hand corner of the display 16. The graphic and depict a smaller representation of the user 34 and of the field of view 35, and can flash consistently or intermittently when the user moves outside of the field of view.

Software providing user tracking feedback can provide training for the user on the display to assist the user in getting a sense of the boundaries of the capture area are and what different feedback responses mean. A certain sound can be identified with being centered in the field of view or having good visibility, while another sound indicates the user is getting too close to a boundary or there is an obstruction or other effect or item degrading the tracking quality.

Figure 2:
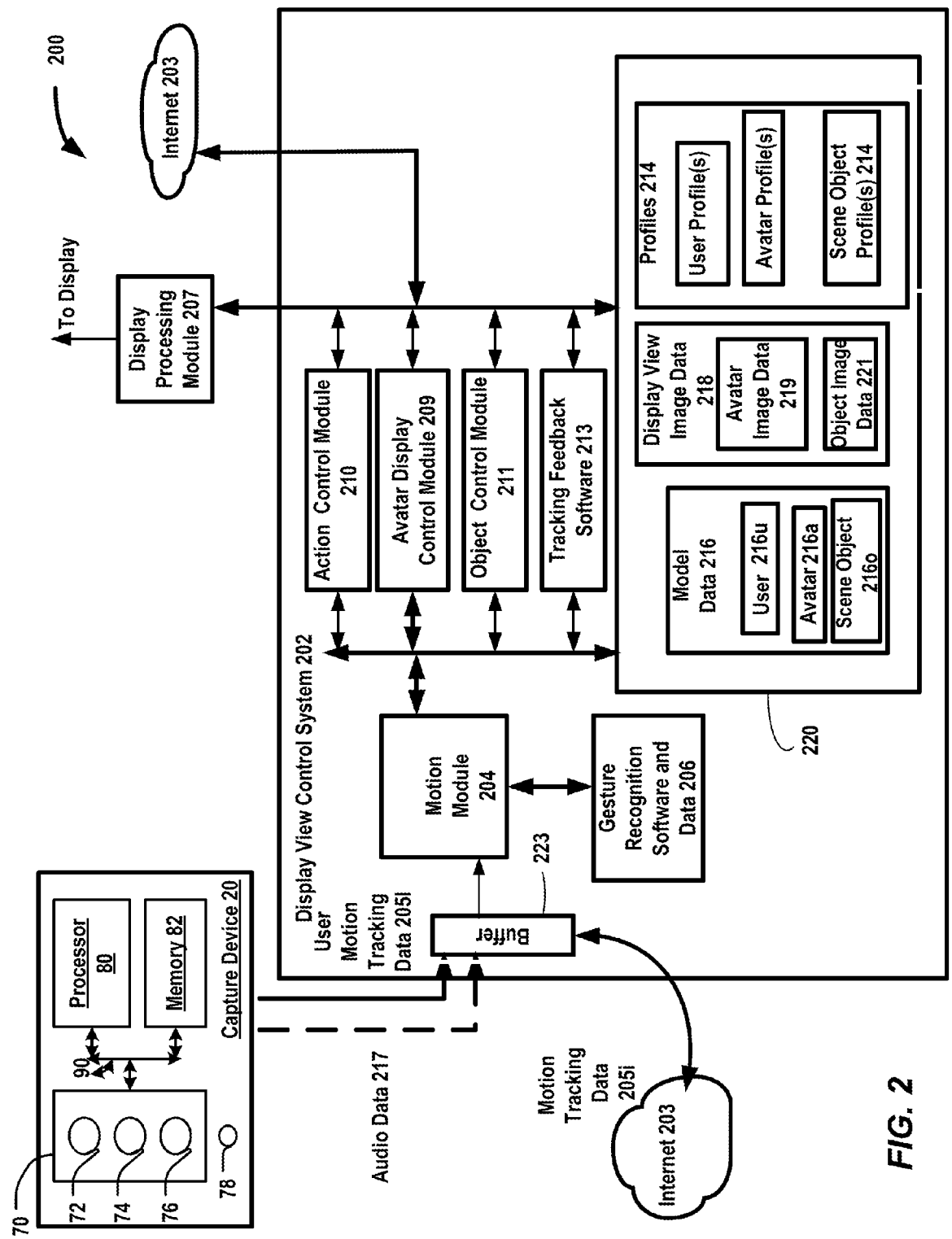
FIG. 2 is an illustrative embodiment of a functional computer-implemented architecture for a system for providing user tracking feedback.

In one example, tracking quality or tracking criteria can be based on how many gestures were not able to be identified in a given time period while user presence and engagement with the target recognition and tracking system has been established. In tracking quality or tracking criteria can be based on detecting presence and engagement, but not being able to recognize a key body part in the image data for the application such as, for example, an arm in a baseball game. Besides visibility factors affecting the tracking criteria or quality, distinguishability factors can also apply audio factors as some applications rely on a body feature such as voice and not just movements of body features which are body parts FIG. 2 is an illustrative embodiment of a functional computer-implemented architecture for a system 200 for providing user tracking feedback. Such an architecture system can be implemented as one or more modules which can operate by software executing on one or more processors and/or computer hardware or as hardware or firmware.

The technology may be embodied in other specific forms without departing from the spirit or essential characteristics thereof. Likewise, the particular naming and division of modules, routines, features, attributes, methodologies and other aspects are not mandatory, and the mechanisms that implement the technology or its features may have different names, divisions and/or formats. Furthermore, as will be apparent to one of ordinary skill in the relevant art, the modules, routines, features, attributes, methodologies and other aspects of the embodiments disclosed can be implemented as software, hardware, firmware or any combination of the three. Of course, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of programming. For example, in one embodiment, the tracking feedback software 213 discussed below can be implemented partially in an application programming interface (API) to handle application independent feedback response, and partially in software of a specific application to handle contextual application feedback.

The display view control system 202 comprises a motion module 204 which access a data buffer 223 for incoming image data 205 and, optionally, audio data 217. In the example embodiment shown, the display view control system 202 receives motion tracking data 205 locally from the audiovisual data capture system 20. Additionally, the display view control system 202 can receive motion tracking data 205i remotely over the Internet 203 or other network. With respect to a user, motion tracking data may comprise the image data itself or a downsampled version of that data. Additionally, depth data, and various forms of data derived from image and/or depth data, can be included in motion tracking data, some examples of which are a model for the body of the user, motion data in mathematical primitives which reference the model, or a bitmask image derived for the user for comparison with a previous state of the model. The display view control system 202 analyzes this data to recognize motion of the user and track that motion to objects on the display, for example, to the user's onscreen avatar. An avatar is a type of scene or display object.

The motion module 204 is communicatively coupled to an avatar display control module 209, an object control module 211, tracking feedback software 213, gesture recognition software and data 206, an audiovisual data capture system 20, and the Internet 203. The motion module 204 also has access to datastores 220 stored in memory such as model data 216 for at least one of each of a user 216u, an avatar 216a, and an object on the display 216o or one held by a user. Model data is used as a reference for motion tracking by the motion module 204 of a user in a capture area, or an avatar or object in a scene or display view. In systems where the user's body movements are mapped to the avatar's movements (e.g. based on image capture of the user, or sensors on the user's body), there can be model data representing the user 216u and model data representing the avatar 216a. Where the avatar's physique is quite different, the motion module 204 performs a mapping between the two models. For example, the boy user 18 is shorter and likely does not have the arm reach of his avatar boxer 24. In other words, if skeletal models were used, they may not be the same for the user and the avatar. In some embodiments, however, the application uses the same model data 216 for analyzing the body movements of a user and for directing the motions of the corresponding avatar. In one example, the body model may be implemented as one or more data structures representing body parts and their positions in dimensions and/or rotation angles with respect to a reference. The model data 216 can be updated with updated in terms of absolute positions or with changes in positions and rotations. The changes in positions and rotations may be represented as vectors and angles.

The motion module 204 also has access to profile data 214. In this example, there are profiles for users 214u, avatars 214a and objects 214o. The motion module 204 also has access to display data 218 which includes avatar image data 219 and object image data 221.

The avatar display control module 209 updates the avatar image data 219 based on gestures recognized by the gesture recognition software 206 and other applicable motion identified by the motion module 204. In one example, the image data 219 representing motions or poses can be motion tracking data for the avatar. In one example, such motion tracking data can be stored in a motion capture file which the motion module 204 updates over time as new motion tracking data 205 is received.

The object control module 211 updates image data 221 for objects effected by the user's recognized gestures. Furthermore, the avatar control module 209 and the object control module 211 update their respective image data (219, 221) responsive to instructions from the action control module 210. The action control module 210 supervises the executing application. For example, in a game environment, it keeps score, determines that a new background is needed as the avatar has moved to a new level of game play, determines how other non-user controlled avatars or objects will be placed in a scene. In a non-gaming environment, it identifies what action the user is requesting. For example, if a user gesture is a request to open a file, it can access the file itself or provide instructions to the object control module 211 to access the file and display it on the display 16. The display processing module 207 combines the display data 218 in order to update the display.

Display data 218 provides a scene or view context and defines the other objects in the scene or view. For example, the display data 218 is providing a context environment of a boxing match in FIGS. 1A and 1B, and the positions of objects including the ropes of a boxing ring and the existence of the opponent boxer avatar 22. The most recent movements, features and body parts of the other boxer avatar 22, in the scene may be stored as another profile in the avatar profile datastore 214 as well. Updates to display data 218 may be received by one or more modules such as the avatar display control module 209 or the motion module 204 over the Internet 203 or other network from a remote module.

The avatar display control module 209 and the object control module 211 periodically or in response to a message from the motion module 204 read updates to their respective profile(s) 214 and process image data 219, 221 representing motions or poses for the avatar or object. The image data 219, 221 can be rendered locally on a display 16 or it can be transmitted over the Internet 203 or another network.

Examples of avatar profile data 214a can be color image data for features of the avatar such as hair, facial features, skin color, clothing, the position of the avatar in the scene and any props associated with it.

Examples of information which can be stored in the profile 214u of a user can include typical modes of usage or play, age, height, weight information, names, disability, high scores or any other information associated with a user and usage of the system.

An example of factor effecting the selection of a feedback response can include user profile information. For example, the age or disability of a user, physical or mental, can make one type of feedback response more appropriate than another. For example, a 5 year old may not be able to read so subtle feedback in the context of the application may be more appropriate than explicit text on the screen. A player may be deaf so an audio response is not appropriate.

As discussed above, some motions and poses, gestures, have special meaning in the context of an entertainment program or other application, and the display view control system 202 executes instructions to identify them. In particular, the motion module 204 has access to gesture recognition software 206 and data for recognizing or identifying gestures based on a model and motion tracking data.

The gesture recognition software 206 can include gesture filters. In one example, the motion module 204 can select one or more gesture filters 206 based on an associative data index, such as a body part index for example. For example, when a motion tracking data set update is received by the display view control system 202 and motion changes for certain body parts are indicated, the motion module 204 indexes gesture filters associated with those certain body parts.

The gestures filters 206 execute instructions based on parameter data defining criteria for determining whether a particular gesture has been performed based on motion tracking data 205. In one embodiment, each gesture filter 206 is linked with a library module for a particular gesture in a gestures library. Each library module associated with a gesture includes executable instructions to perform processing responsive to the gesture. This processing often involves updating the avatar's motion or image to reflect the gesture in some form.

For example, the teenage boy user 18 in FIG. 1A has a much smaller physique than his avatar 24 boxer. Part of the fun of playing games with avatars is that they often do things better than the user in real-life. The punch of the boy 18 in FIG. 1A in his living room translates into a much more intensive punch by his avatar 24 on the display screen 14. The library module for a "punch" in the boxing game may determine from the acceleration in speed of the user's first being extended by his elbow, that this is a "power punch" for this user 18 in the game, and his avatar's 24 punch reflects this on the display due to the library punch module's instructions. The action control module 210 is also notified of the gesture and responds to it. For example, it updates the score of the user 18.

Some systems may provide a combination of only a certain number of motions or poses that an avatar can perform for certain body parts or regions, for example the hands and arms, while allow direct tracking of other body parts or regions, for example the legs.

The tracking of user motions to update the display of an avatar or other display view objects is performed in real time such that the user may interact with an executing application in real time. A real-time display refers to the display of a visual representation responsive to a gesture, wherein the display is simultaneously or almost simultaneously displayed with the performance of the gesture in physical space. For example, an update rate of the display at which the system may provide a display that echoes a user may be at a rate of 20 Hz or higher, wherein insignificant processing delays result in minimal delay of the display or are not visible at all to the user. Thus, real-time includes any insignificant delays pertaining to the timeliness of data which has been delayed by the time required for automatic data processing.

The tracking feedback software 213 receives a message from the motion module 204 identifying a tracking issue. An example of a tracking issue is that the user has moved out of the field of view or no user is in the field of view. Some other examples of a tracking issue is a gesture for a body part cannot be determined or a threshold probability that a motion or pose corresponds to any particular gesture is not satisfied. Another example of a tracking issue is the loudness of sound is not enough for speech or song recognition software to detect the sound of the user. In another example, the sound from the user has indistinguishable syllables so the words cannot be detected. For example, in a music entertainment application, the inability to identify or detect the user's singing can significantly affect frustration felt by the user player.

The motion module 204 can also provide feedback on a number of distinguishability factors based on data it has received from the audiovisual capture system 20 or in messages from the audiovisual capture system 20. One type of distinguishability factor is audio factors like not enough volume and distinctiveness as mentioned above. Another example of a distinguishability factor is a visibility factor. An example of a visibility factor is the user or a body part for controlling the application being at least partially out of the field of view. Another is lighting issues washing out the user in the image captured. Another example is an obstruction. Another example of a visibility factor is an obstruction. An example of this can be furniture, even in the field of view itself like the coffee table 15 in FIG. 1C. Two many items on the borders of the field of view or in the view itself can create a distinguishability or visibility factor. Another example of an obstruction is an article of clothing or clothing in combination with another item. A poncho top can inhibit detecting arm movements. A long skirt can inhibit detecting leg movements for a game where a user can make walking or running gestures. Black pants against a black couch can cause visibility issues due to lack of contrast The capture system 20 cannot distinguish legs movements when the user is near the black couch. Clothing color can cause contrast problems resulting in a distinguishability issue. Additionally, people standing too close to a user can cause a distinguishability issue as well, as their arms and legs can overlap. Depth data can help distinguish the user, but it can be an issue based on the depth resolution of the image capture system 20.

The tracking feedback software 213 can select a type of feedback indicating a tracking problem to provide to a user. In some examples, the feedback provides instructions to the user to improve the tracking quality with a visual or audio indicator which is independent of the activity of the application. For example, the explicit screen arrow overlay 33 in FIG. 1B. It can also be accompanied a text or audio message to "Move Right" while it points towards the center of the field of view 30.

Other feedback can be a bit more implicit and subtle. Visual characteristics of the display can be changed. For example, feedback can be that the sharpness of the display view can be slightly degraded as the user gets within a distance of a boundary of the field of view. It gets blurrier for example. As the user moves toward the center of the field of view, the sharpness of the scene improves. The user may not even consciously notice the change in sharpness. Besides sharpness, another visual characteristic example which can be changed to alter the display of the scene or view is the vibrancy of the color. Another example is the color itself. For example, as the user moves out of the field of view, the color on the display goes to black and white.

In some examples, the tracking feedback software 213 determines feedback in the context of the application is appropriate. Some of these examples have been mentioned above such as a monster on the border the user is too close to or a ball for a user to "hit" being sent in a direction in which the user should move. Other examples would include an enemy to shoot at in a direction to move towards, or another avatar player comes in and bumps the user back toward the center or other characters run in a direction to get back in the field of view. In another example, a sound can be directed in a certain direction to motivate a user to run towards it out away from that direction. If the user is too far away from the image capture system 20 as shown in depth data captured by the system 20, a flashing object or other attention getting display object can be used to attract the user forward into the field of view. If a user is getting to close to the camera 20, e.g. between the field of view front boundary, 30f and the camera, a display object can be made to fill the screen quite a lot to make a user take steps backward.

For this contextual application feedback, the tracking feedback module 213 sends a request to the action control software module 210 for contextual feedback. The action control module 210 or the tracking software 213 can track which contextual feedback techniques have been used to avoid repetition as much as possible. The contextual feedback request can include the type of distinguishability factor to be addressed. It can further include a suggestion for action. For example, it can also include a target zone on the display in which to place an object to motivate movement of a user back in the field of view. In other cases, the action control module 210 can determine the action to take.

The tracking feedback software 213 can base its selection of a feedback response on criteria. As mentioned above, one example of such criteria is the age of the user. For a 3 or 4 year old, placing an item in a target zone on the screen to make that user move may not be too repetitive for a child of that age. For a 7 year old, the specific contextual feedback technique may need to be varied a bit more.

The competitiveness level of the application can be another factor. In a game playing against another user, putting a target to shoot at in a display zone to encouragement movement of the user can be inappropriate. However, placing an explosion near the border of the field of view can make the user move without increasing predictability of targets.

Some applications do not want anything obscuring the action being displayed by the application on the display. In these instances, display 16 or console 12 can include off-screen display devices. For example, the light emitting diode (LED) 32 on the console 12 or on camera 20 can be associated with the user, and the ability of the application to track the user can be indicated by a color palette. For example, green is good. Yellow is a warning that tracking ability is degrading, and red indicates tracking ability has degraded to an unacceptable level. Other off-screen display devices or views can be used such as bar graphs or other lights on the console 12, display 16, or camera 20 indicating the degree of tracking ability.

As a compromise, the application can allow a small icon to appear on a user's avatar for a user who is too near a boundary or whose tracking is not satisfying tracking criteria. The user can select the icon if desired. In another example, a small box, picture in picture, showing the user or his avatar can be displayed indicating a tracking issue and even a suggestion for addressing it. In another example, if the user hits pause, a box showing the user or his avatar with the tracking issue message can be displayed.

In other examples, the tracking feedback module 213 can send a request for a change in appearance of an avatar to the avatar display control module 209. An example of a change in appearance can be a highlighting of the avatar. Other examples include changing visual characteristics such as blurring the avatar's appearance, or making it all black or all white or black and white as opposed to color. The avatar can be made to look faded in another example. Particularly if a training session occurred prior to the start of the application, the user can be instructed that a change of appearance of his avatar means there are tracking problems with his gestures. For field of view issues, this can be effective without changing competitive action too much.

Feedback can be audio or audiovisual. For example, in a training session before start of the activity of the application, a user can be instructed that a particular icon means a particular visibility factor is effecting recognition of the user's gestures. The icon can be accompanied by a particular sound so the user knows it is he who, for example, knows to move inbounds.

As not being able to detect a user's gestures properly can significantly affect execution of the application, pausing the action, perhaps coupled with a change in appearance of the user's avatar, can be a feedback response selected as well. In another example, the sound can be stopped.

In some embodiments, tracking feedback software can be separate from a particular application. For example, the tracking feedback software can provide an API to which an application can send a request for a feedback response. This can be a convenient interface for application developers who wish to use default feedback responses. Of course, other constructs besides an API can be used. The application software can provide additional types of user tracking feedback responses to those provided by the API or which the application developer prefers to use instead of the default mechanisms. In other embodiments, the tracking feedback software can be handled within the application entirely or by application independent software entirely. The technology described herein is not limited to a particular code level implementation. The image capture system 20 recognizes human and non-human targets in a capture area (with or without special sensing devices attached to the subjects), uniquely identifies them and tracks them in three dimensional space.

According to an example embodiment, the image capture system 20 may be configured to capture video with depth information including a depth image that may include depth values via any suitable technique including, for example, time-of-flight, structured light, stereo image, or the like. As shown in FIG. 2, according to an example embodiment, an image camera component 70 may include an IR light component 72, a three-dimensional (3-D) camera 74, and an RGB camera 76 that may be used to capture the depth image of a capture area. For example, in time-of-flight analysis, the IR light component 72 of the capture system 20 may emit an infrared light onto the capture area and may then use sensors to detect the backscattered light from the surface of one or more targets and objects in the capture area using, for example, the 3-D camera 74 and/or the RGB camera 76. In some embodiments, pulsed infrared light may be used such that the time between an outgoing light pulse and a corresponding incoming light pulse may be measured and used to determine a physical distance from the capture system 20 to a particular location on the targets or objects in the capture area. Additionally, in other example embodiments, the phase of the outgoing light wave may be compared to the phase of the incoming light wave to determine a phase shift. The phase shift may then be used to determine a physical distance from the capture system to a particular location on the targets or objects.

According to another example embodiment, time-of-flight analysis may be used to indirectly determine a physical distance from the capture system 20 to a particular location on the targets or objects by analyzing the intensity of the reflected beam of light over time via various techniques including, for example, shuttered light pulse imaging.

In another example embodiment, the capture system 20 may use a structured light to capture depth information. In such an analysis, patterned light (i.e., light displayed as a known pattern such as grid pattern or a stripe pattern) may be projected onto the capture area via, for example, the IR light component 72. Upon striking the surface of one or more targets or objects in the capture area, the pattern may become deformed in response. Such a deformation of the pattern may be captured by, for example, the 3-D camera 74 and/or the RGB camera 76 and may then be analyzed to determine a physical distance from the capture system to a particular location on the targets or objects.

According to another embodiment, the capture system 20 may include two or more physically separated cameras that may view a capture area from different angles, to obtain visual stereo data that may be resolved to generate depth information.

As an example of the synergy provided by these elements, consider that the IR light component 72 and the 3-D camera 74 may provide a depth image of a capture area, but in certain situations the depth image alone may not be sufficient to discern the position or movement of a human target. In those situations, the RGB camera 76 may "take over" or supplement the information from the 3-D camera to enable a more complete recognition of the human target's movement or position. For example, the RGB camera may be used to recognize, among other things, colors associated with one or more targets. If a user is wearing a shirt with a pattern on it that the depth camera may not be able to detect, the RGB camera may be used to track that pattern and provide information about movements that the user is making. As another example, if a user twists, the RGB camera may be use to supplement the information from one or more other sensors to determine the motion of the user. As a further example, if a user is next to another object such as a wall or a second target, the RGB data may be used to distinguish between the two objects. The RGB camera may also be capable of determining fine features of a user such as facial recognition, hair color and the like which may be used to provide additional information. For example, if a user turns backwards, the RGB camera may use hair color and/or the lack of facial features to determine that a user is facing away from the capture system.

The capture system 20 can capture data at interactive rates, increasing the fidelity of the data and allowing the disclosed techniques to process the raw depth data, digitize the objects in the scene, extract the surface and texture of the object, and perform any of these techniques in real-time such that the display (e.g. 16) can provide a real-time depiction of the scene on its display screen (e.g. 54).

Figure 3A:
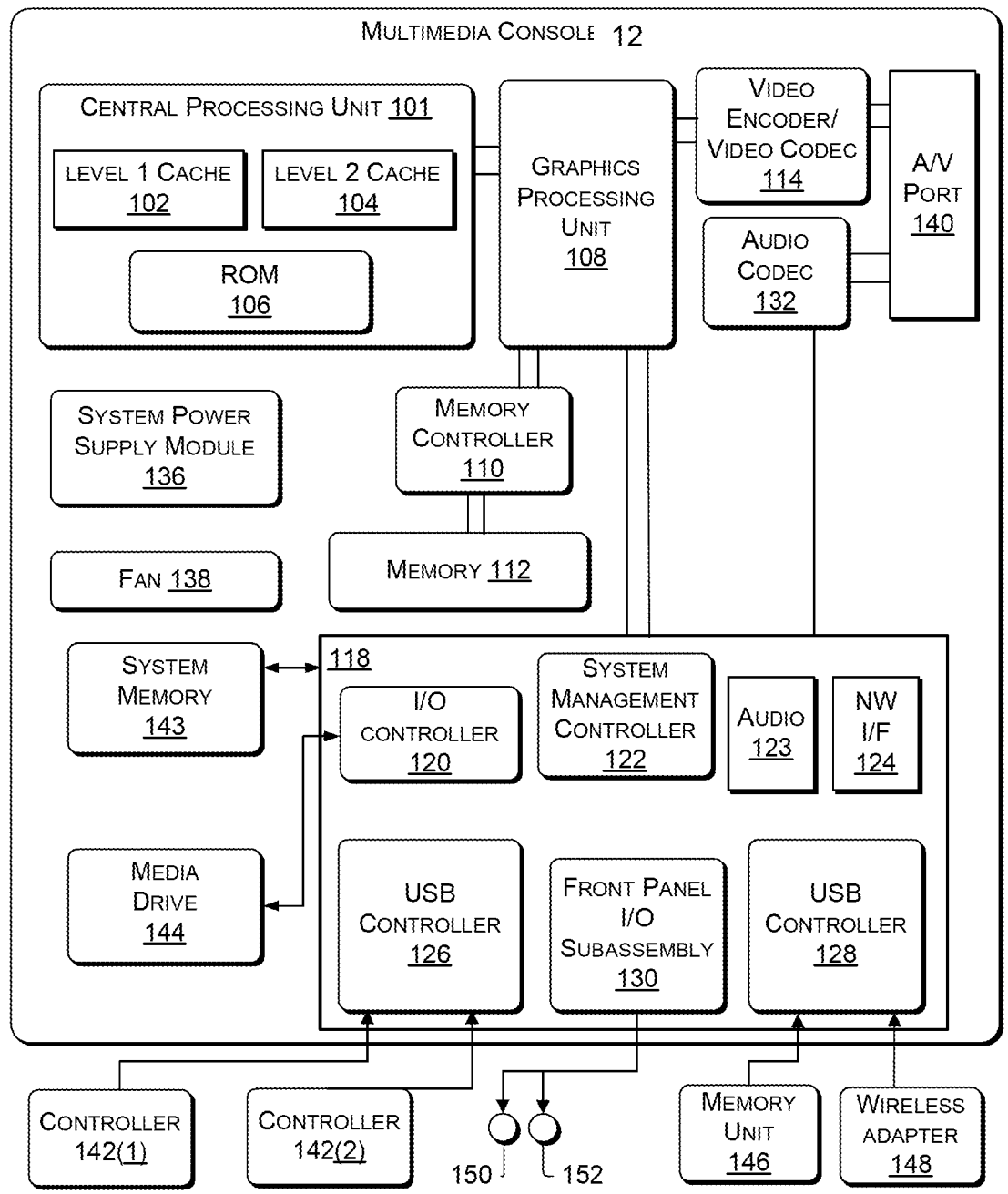
FIG. 3A illustrates a detailed example of an embodiment of a computing environment that may be used in a gaming console like that in FIGS. 1A-1E in which one or more embodiments for providing user tracking feedback can operate.
Figure 3B:
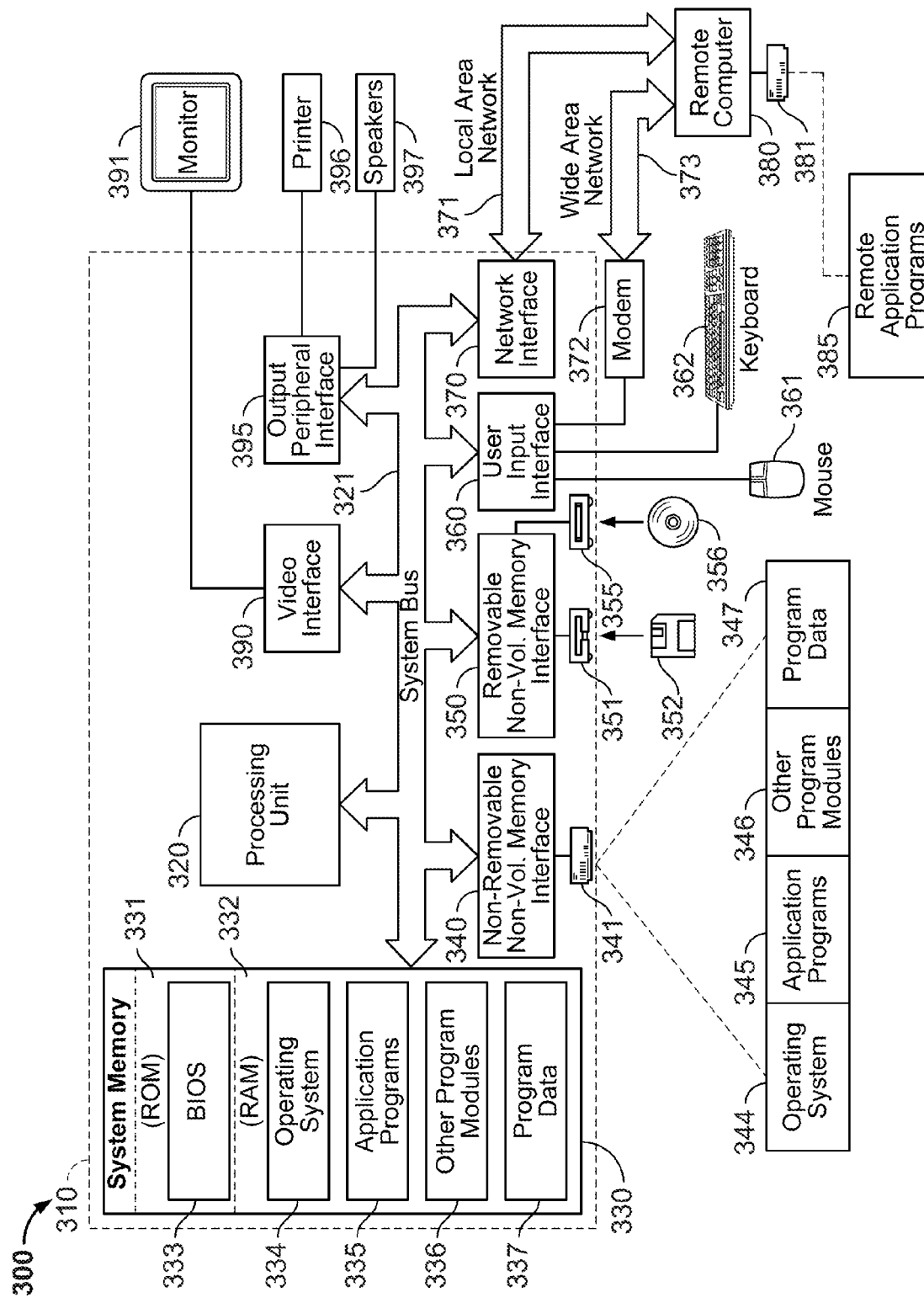
FIG. 3B illustrates another example embodiment of a computing environment such as a personal computer.

In the system embodiment of FIG. 2, the image capture system 20 is communicatively coupled to a computing environment such as the computer systems examples in FIGS. 3A-3B to send the motion tracking data 205l and optionally audio data 217. The communication coupling can be implemented in one or more wired or wireless connections such as, for example, a USB connection, a Firewire connection, an Ethernet cable connection, or the like and/or a wireless connection such as a wireless 802.11b, g, a, or n connection.

The capture system 20 further includes a memory component 82 for storing instructions that may be executed by the processor 80, as well as image data which may be captured in a frame format. The memory component 82 may include random access memory (RAM), read only memory (ROM), cache, Flash memory, a hard disk, or any other suitable storage component. In one embodiment, the memory component 82 may be a separate component in communication 90 with the image capture component 70 and the processor 80 as illustrated. According to another embodiment, the memory component 82 may be integrated into the processor 80 and/or the image capture component 70.

The capture system 20 further includes a processor 80 communicatively coupled 90 to the image camera component 70 to control it and the memory 82 for storing image data. The processor 80 may include a standardized processor, a specialized processor, a microprocessor, or the like that may execute instructions that may include instructions for storing profiles, receiving depth image data, storing the data in a specified format in memory 82, determining whether a suitable target may be included in the depth image, converting the suitable target into a skeletal representation or other type of model of the target, or any other suitable instruction. Furthermore, some of this processing may be executed by other processors in one or more communicatively coupled computing environments.

The inclusion of processing capabilities in the image capture system 20 enables a model such as a multi-point skeletal model, of a user to be delivered in real-time. In one embodiment, there may be a separate processor for each of multiple components of the capture system, or there may be a single central processor. As another example, there may be a central processor as well as at least one other associated processor. If there is a high cost computing task, the two or more processors may share the processing tasks in any way. The processor(s) may include a memory as described above and the memory may store one or more user profiles. These profiles may store body scans, typical modes of usage or play, age, height, weight information, names, avatars, high scores or any other information associated with a user and usage of the system.

The capture system 20 may further include a microphone 78 which can be used to receive audio signals produced by the user. Thus, in this embodiment, the image capture system 20 is an audiovisual data capture system. The microphone(s) in the capture system may be used to provide additional and supplemental information about a target to enable the system to better discern aspects of the target's position or movement. For example, the microphone(s) may comprise directional microphone(s) or an array of directional microphones that can be used to further discern the position of a human target or to distinguish between two targets. For example, if two users are of similar shape or size and are in a capture area, the microphones may be used to provide information about the users such that the users may be distinguished from each other base, for example, on recognition of their separate voices. As another example, the microphones may be used to provide information to a user profile about the user, or in a 'speech to text' type embodiment, where the at least one microphone may be used to create text in a computing system.

Pixel data with depth values for an image is referred to as a depth image. According to one embodiment, the depth image may include a two-dimensional (2-D) pixel area of the captured scene where each pixel in the 2-D pixel area has an associated depth value such as a length or distance in, for example, centimeters, millimeters, or the like of an object in the captured scene from a point of reference, e.g. with respect to some aspect of the camera component 70. For example, the depth values for the pixels may be represented in "Z layers," which are layers that may be perpendicular to a Z axis extending from the depth camera 70 along its line of sight. These depth values may be referred to collectively as a depth map.

A depth image may be downsampled to a lower processing resolution such that the depth image may be more easily used and/or more quickly processed with less computing overhead. For example, various regions of the observed depth image can be separated into background regions and regions occupied by the image of the target. Background regions can be removed from the image or identified so that they can be ignored during one or more subsequent processing steps. Additionally, one or more high-variance and/or noisy depth values may be removed and/or smoothed from the depth image. Portions of missing and/or removed depth information may be filled in and/or reconstructed. Such backfilling may be accomplished by averaging nearest neighbors, filtering, and/or any other suitable method. Other suitable processing may be performed such that the depth information may used to generate a model such as a skeletal model.

FIG. 3A illustrates a detailed example of an embodiment of a computing environment that may be used in a gaming console like that in FIGS. 1A-1E in which one or more embodiments for providing user tracking feedback can operate. As shown in FIG. 3A, the multimedia console 12 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 12 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 12 includes an I/O controller 120, a system management controller 122, an audio processing unit 123, a network interface controller 124, a first USB host controller 126, a second USB controller 128 and a front panel I/O subassembly 130 that are implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 12. The media drive 144 is connected to the I/O controller 120 via a bus, such as a Serial ATA bus or other high speed connection (e.g., IEEE 1394).

In one embodiment, a copy of the software and data for the display view control system 202 can be stored on media drive 144 and can be loaded into system memory 143 when executing.

The system management controller 122 provides a variety of service functions related to assuring availability of the multimedia console 12. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 12. A system power supply module 136 provides power to the components of the multimedia console 12. A fan 138 cools the circuitry within the multimedia console 12.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 12 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 12.

The multimedia console 12 may be operated as a standalone system by simply connecting the system to a television or other display. In this standalone mode, the multimedia console 12 allows one or more users to interact with the system, watch movies, or listen to music. However, with the integration of broadband connectivity made available through the network interface 124 or the wireless adapter 148, the multimedia console 12 may further be operated as a participant in a larger network community.

When the multimedia console 12 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation is large enough to contain the launch kernel, concurrent system applications and drivers. The CPU reservation is constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 12 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager controls the switching of input stream, without knowledge the gaming application's knowledge and a driver maintains state information regarding focus switches. The image capture system 20 may define additional input devices for the console 12 (e.g. for its camera system).

FIG. 3B illustrates another example embodiment of a computing environment such as a personal computer. With reference to FIG. 3B, an exemplary system for implementing the technology includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3B illustrates operating system 334, application programs 335, other program modules 336, and program data 337.

The computer 310 may also include other removable/non-removable, volatile/nonvolatile computer storage media. By way of example only, FIG. 3B illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through an non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3B, provide storage of computer readable instructions, data structures, program modules and other data for the computer 310. In FIG. 3B, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

In one embodiment, a copy of the software and data for the display view control system 202 can be stored in the applications programs 345 and program data 347 stored on the hard drive 238 or remotely (e.g. 248). A copy can also be loaded as an application program 226 and program data 228 in system memory 222 when executing.

A user may enter commands and information into the computer 20 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through a output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3B illustrates remote application programs 385 as residing on memory device 381. It will be appreciated that the network connections shown are exemplary and other means of establishing a communications link between the computers may be used.

Figure 4:
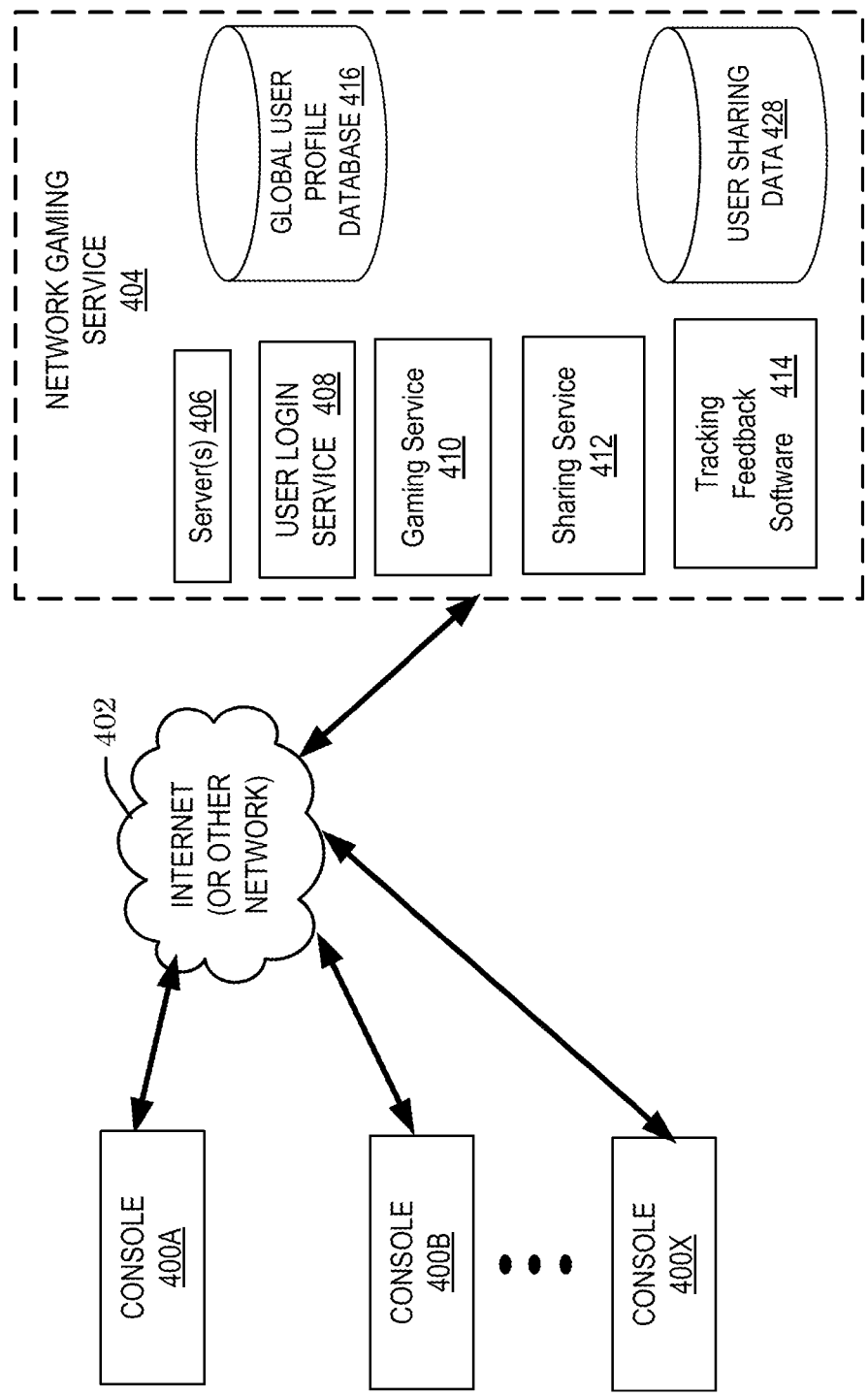
FIG. 4 illustrates an example embodiment of a networked computing environment in which one or more embodiments for providing user tracking feedback to a user can operate.

FIG. 4 illustrates an example embodiment of a networked computing environment in which one or more embodiments for providing user tracking feedback to a user can operate. As shown in FIG. 4, multiple consoles 400A-400X or processing devices, such as those illustrated in FIGS. 3A and 3B may be coupled to a network 402 and can communicate with each other and a network gaming service 404 having one or more server(s) 406 via network 402. The server(s) 406 may include a communication component capable of receiving information from and transmitting information to consoles 400A-X and may provide a collection of services that applications running on consoles 400A-X may invoke and utilize.

Consoles 400A-X may invoke user login service 408, which is used to authenticate and identify a user on consoles 400A-X. During login, login service 408 obtains a gamer tag (a unique identifier associated with the user) and a password from the user as well as a console identifier that uniquely identifies the console that the user is using and a network path to the console. The gamer tag and password are authenticated by comparing them to a global user profile database 416, which may be located on the same server as user login service 408 or may be distributed on a different server or a collection of different servers. Once authenticated, user login service 408 stores the console identifier and the network path in the global user profile database 416 so that messages and information may be sent to the console.

In an embodiment, consoles 400A-X may include a gaming service 410, a sharing service 412, user sharing data 428 and a substitution database 418. The gaming service may allow users to play online interactive games, create and share gaming environments for joint game play between consoles, and provide other services such as an online marketplace, centralized achievement tracking across various games and other shared experience functions. A sharing service 412 allows users to share game play elements with other users. For example, a user on a console 400x may create elements for use in games and share them or sell them to other users. In addition, a user may record elements of the game play experience, such as a movie of a race or various scenes in a game, and share them with other users. Information provided by users for sharing or sale may be stored in the user sharing data 428.

The global user profile database 416 may include information about all the users on consoles 400A-X such as the users' account information and a console identifier that uniquely identifies a particular console that each user is using. The global user profile database 416 may also include user preference information associated with all the users on consoles 400A-X. The global user profile database 416 may also include information about users such as game records and a friends list associated with users.

Tracking feedback software 414 may be provided in the gaming service 404. The tracking feedback software can respond to tracking issues with gestures and movements in game play elements uploaded to the server and stored in user sharing data 428.

Any number of networked processing devices may be provided in accordance with a gaming system as provided in FIG. 4. As such, the technology presented herein may operate on one or more servers 406 in conjunction with a gaming service 404 or may be provided in individual processing devices in a networked environment, such as devices 400A-400x.

Figure 5:
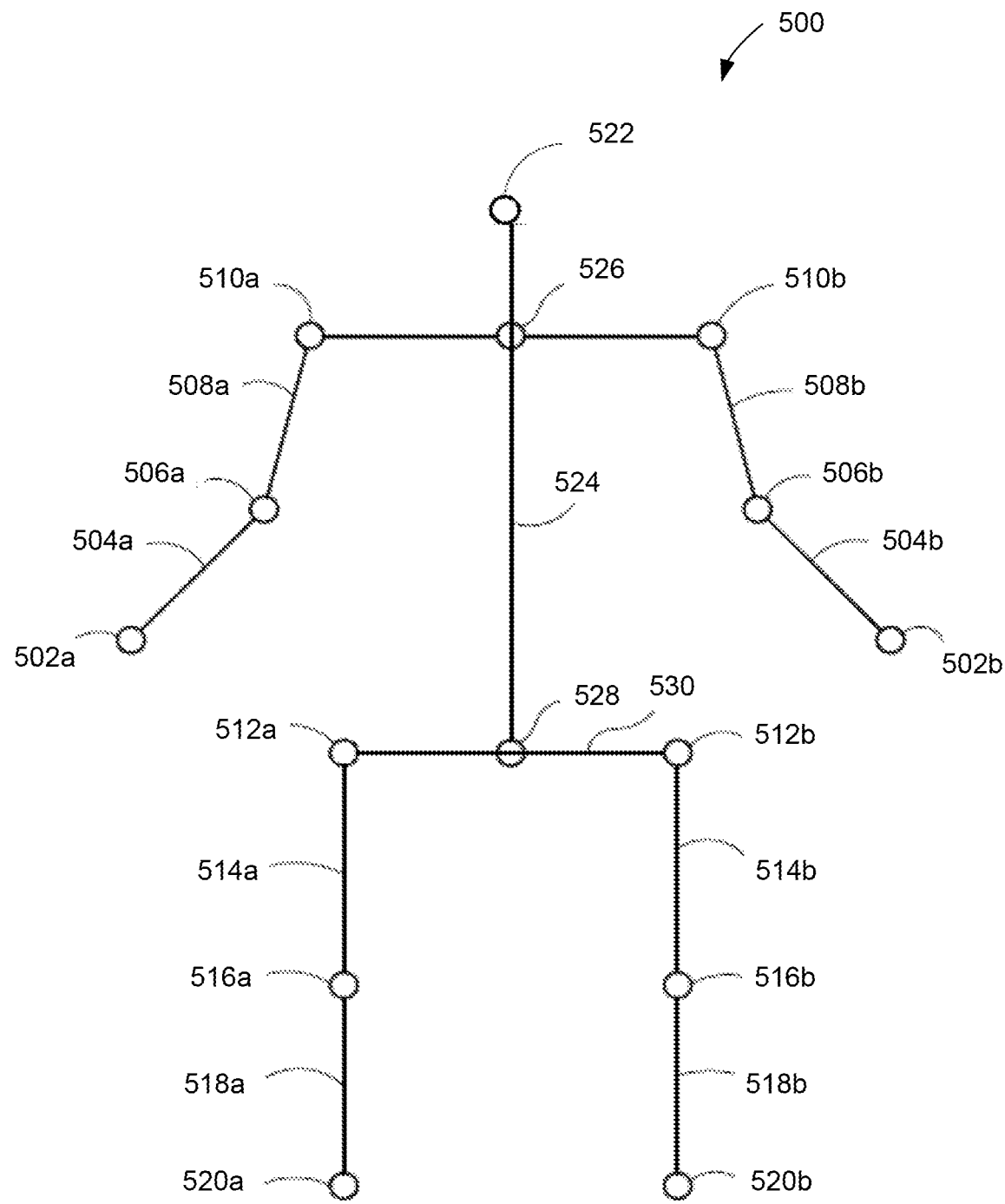
FIG. 5 depicts a model of a human user that may be created based on captured image data and used for tracking a user's movements.

FIG. 5 depicts a model of a human user 500 that may be created using the capture system 20 and the computing environment 12. The example skeletal mapping 500 of a user may have been generated from the motion tracking data 205 captured by the audiovisual data capture system 20. This model may be used by one or more aspects of the gesture based system 10 to determine gestures and the like. The model may be comprised of joints and bones. Tracking these joints and bones may allow the gesture based system to determine what gestures a user is making. These gestures may be used to control the gesture based system. In this embodiment, a variety of joints and bones are identified: each wrist 502a, 502b, each forearm 504a, 504b, each elbow 506a, 506b, each bicep 508a, 508b, each shoulder 510a, 510b, each hip 512a, 512b, each thigh 514a, 514b, each knee 516a, 516b, each foreleg 518a, 518b, each foot 520a, 520b, a head 522, a torso 524, a top 526 and bottom 528 of the spine, and a waist 530. Where more points are tracked, additional features may be identified, such as the individual features of the face, such as the nose and eyes. However, the more data changes tracked also may slow the avatar display down.

Figure 6:
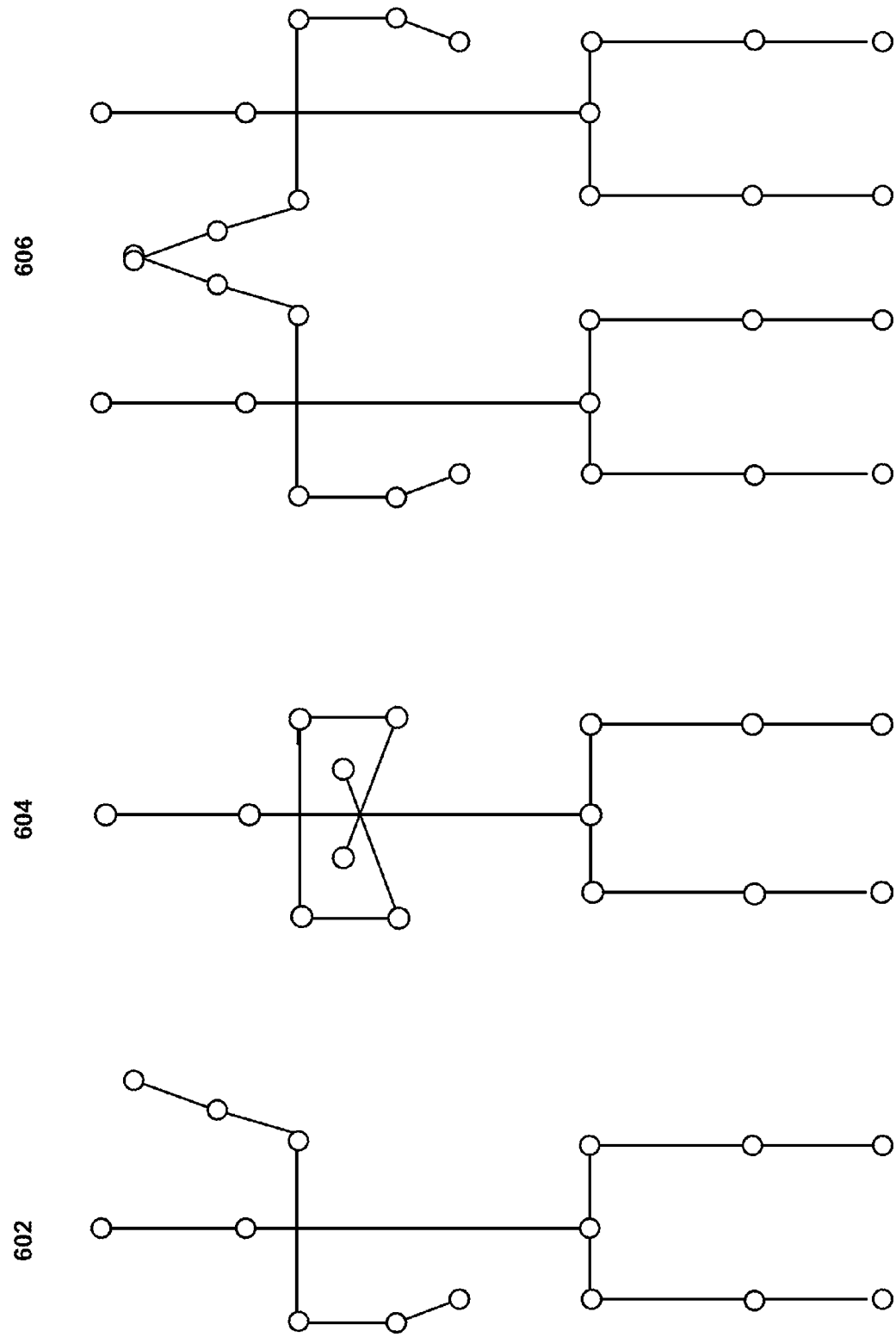
FIG. 6 depicts some examples of gestures.

FIG. 6 depicts a series of gestures such as a wave or raised hand 602, making an X with arms 604, or a high five 606. Although not limited in any way by the few gestures that have been depicted, these gestures, along with any others may be commands for the gesture based system 10. In one embodiment, gestures may be universal, meaning that they would not be limited to particular software or hardware applications. In another embodiment games or other programs operated on computing environment 12 may have program specific gestures. For example, a universal gesture to handoff control of the game to another player may be a handshake; however, a game such as a wrestling game may have a program specific gesture which performs a handoff of control if the users perform a high-five 524.

Figure 7:
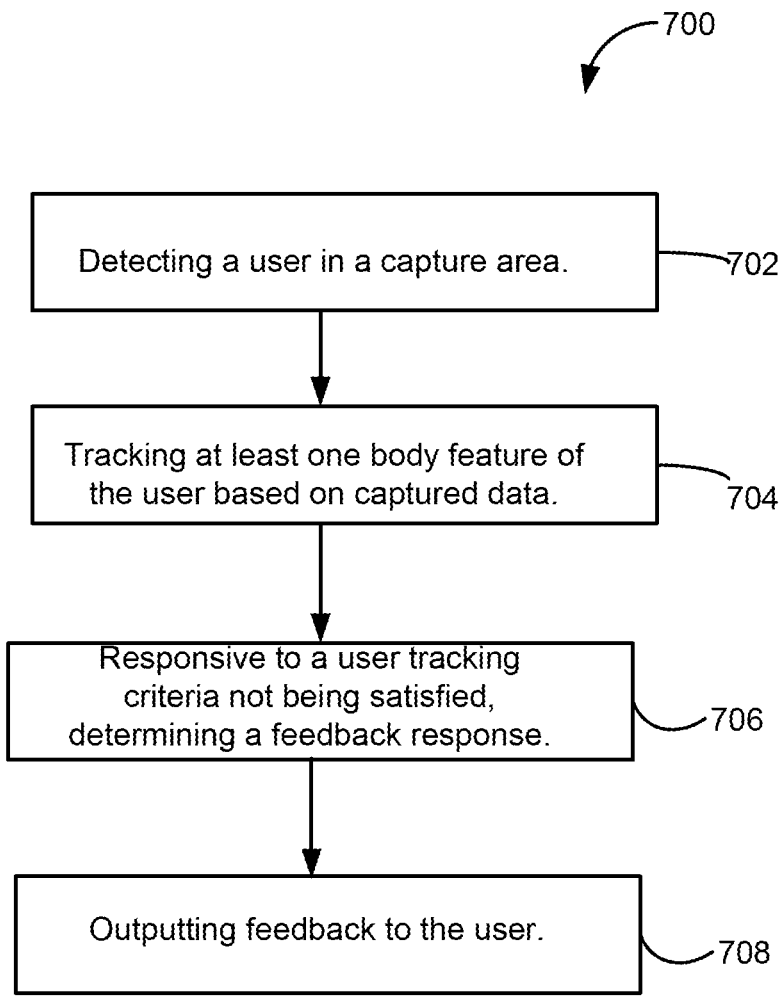
FIG. 7 is a flowchart of a method embodiment for providing feedback to a user on an ability of an application to track user motion.
Figure 8:
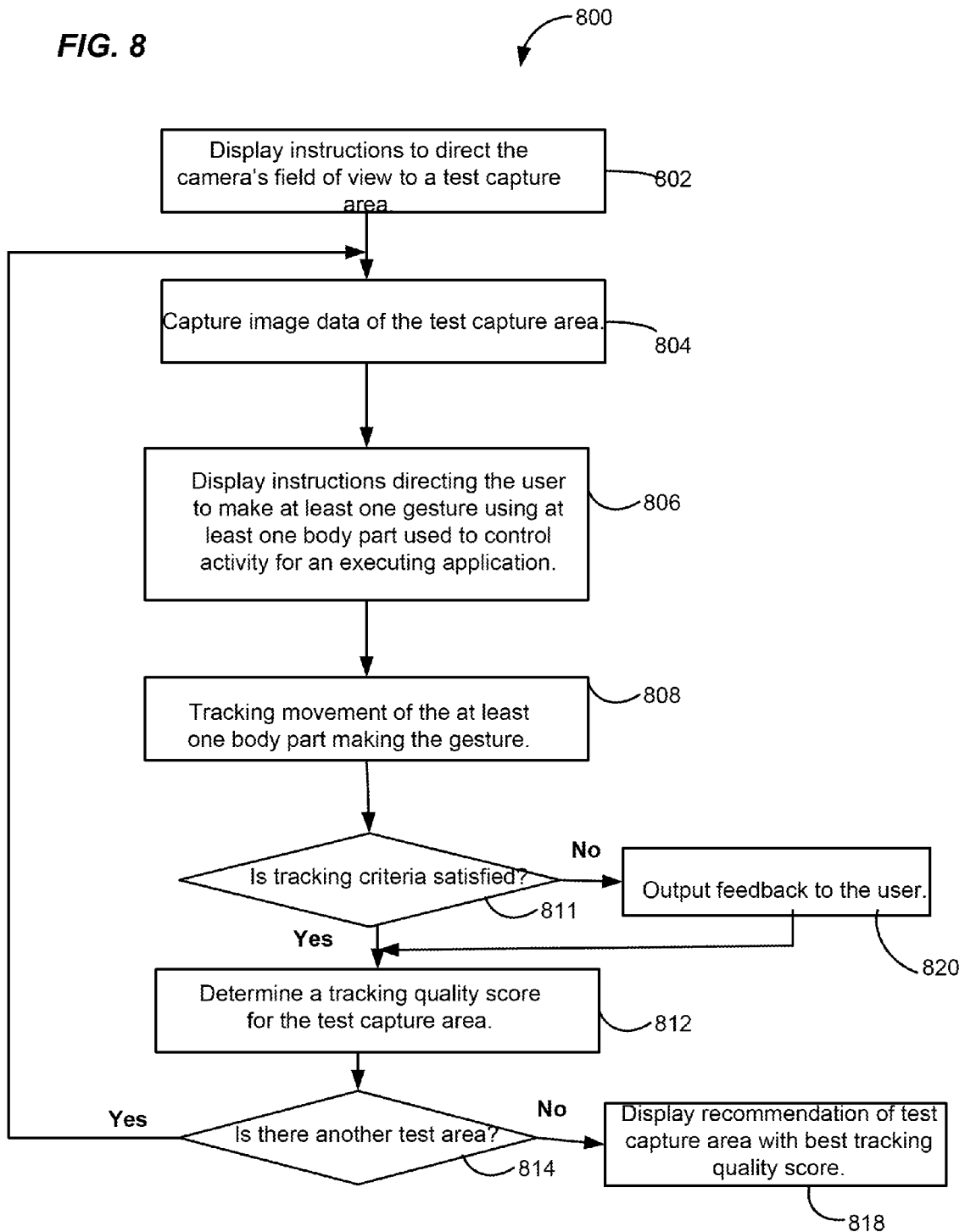
FIG. 8 is a flowchart of a method embodiment for assisting a user in selecting a capture area.

The method embodiments of FIGS. 7 and 8 respectively are discussed in the context of the functional computer-implemented architecture embodiment of FIG. 2 for illustrative purposes only and not to be limiting thereof.

FIG. 7 is a flowchart of a method embodiment 700 for providing feedback to a user on an ability of an application to track user motion. The capture system detects 702 a user in a capture area. The motion module 204 receives the motion tracking data 205l and optionally, audio data 217 and tracks 704 at least one body feature of the user based on data generated by the capture system. Responsive to a user tracking criteria not being satisfied for an executing application, the tracking feedback software 213 determines 706 a feedback response and causes outputting 708 of feedback to the user. As described above, the outputting of feedback can include displaying visual indicators, providing an audio indicator or providing an action within the context of the activity of the application.

FIG. 8 is a flowchart of a method embodiment 800 for assisting a user in selecting a capture area. The tracking feedback software 213 displays instructions instructing 802 a user to direct the camera's field of view to a test capture area, and the capture system 20 captures 804 image data of the test capture area. In one embodiment, the tracking feedback software 213 can display the image data of the test capture area on the display so the user can see himself. The tracking feedback software 213 displays 806 instructions directing the user to make at least one gesture using at least one body part used to control activity for an executing application. The motion module 204 tracks 808 movement of the at least one body part making the gesture. The software 213 determines 811 whether the tracking criteria is being satisfied. Responsive to user tracking criteria being satisfied, the tracking feedback software 213 determines 812 a tracking quality score for the test capture area.

The motion module 204 can provide scores or weights or some value representative of the quality of certain visibility factors for the test capture area to the tracking feedback software 213 for it to compare with tracking criteria based on visibility factors. In one embodiment, a weighting algorithm can then be applied to these factors to determine a score. Some examples of the factors include the location of the user's body part for the gesture in the field of view of the capture system, the lighting in the capture area, and obstructions of the body part.

The different capture areas are rated or scored, and the best one is recommended 818. In another alternative, the image capture system 20 is rotated through a range of angles capturing different views in a room, and suggesting as a capture area the one that provides the best tracking ability. The capture area with the best tracking ability can be displayed on the display 16 via the display processing module 207 to identify it for the user.

The motion module 204 may not be able to match a gesture with the movement the user is making, and can send a message to the tracking feedback software 213 indicating so. The motion module 204 can also indicate a visibility factor which is contributing to user tracking criteria not being satisfied. For example, the representative quality value for the visibility factor lighting can indicate it is poor.

Responsive to the user tracking criteria not being satisfied, the tracking feedback software 213 determines how one or more of the visibility factors can be improved for tracking, and outputs 820 feedback to the user identifying at least one change in the capture area to improve a visibility factor. The feedback can be outputted via visual display or as an audio message.

The tracking feedback software 213 determines 812 a tracking quality score for the test capture area. The motion module 204 can provide scores or weights or some value representative of the quality of certain visibility factors for the test capture area to the tracking feedback software 213 which can apply a weighting algorithm to these factors to determine a score.

The tracking feedback software 213 determines 814 whether there is another test capture area to be tested. For example, it requests user input via the display as to whether there is another test capture area. If there is another test capture area, the steps are repeated for this test area. If there is not another test capture area, the tracking feedback software 213 displays a recommendation of the test capture area with the best visibility score. For example, the test capture area with the best score is displayed on the display. If there is another capture area, the software 213 displays 802 instructions to direct the camera's field of view to the next capture area and repeat the steps above.

The foregoing detailed description has been presented for purposes of illustration and description. It is not intended to be exhaustive or to limit the technology disclosed to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. Moreover, it should be noted that the language used in the specification has been principally selected for readability and instructional purposes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a computer-implemented system operable to track user action for control of a displayed object, a method for providing feedback to a user on an ability of the system to track user action comprising:

detecting the user in a capture area with a capture system, the user interacting with an application on the system having interactive display objects, the application configured to display an application interface using interactive display objects during execution of the application, the user interacting with an interactive display object of the interactive display objects for a purpose of furthering an objective of the application, the interactive display object moving independently of the user, the user moving left, right, up or down in order to be in a position to interact with the interactive display object;

tracking at least one body feature of the user based on data generated by the capture system;

while executing the application and responsive to user tracking criteria not being satisfied during execution of the application, rendering the interactive display object during execution of the application in a new position on the display, moved toward a center of the display, such that a user moves toward a center of the capture area in order to interact with the interactive display object.

2. The method of claim 1, wherein the application comprises a first game application, and the interactive display object comprising a first interactive display object, the method further comprising:

receiving user interaction with a second, different game application on the system and repeating the tracking for the second application;

while executing the second game application and, responsive to user tracking criteria not being satisfied during game play in the second game application, determining a rendering of a second interactive display object of the second game application, the second interactive display object being different than the first interactive display object, rendering the second interactive display object of the second game application during game play such that interaction by the user with the second display object of the second application repositions the at least one body part of the user.

3. The method of claim 2 further comprising:

wherein the capture system is an image capture system;

wherein the user tracking criteria not being satisfied is that a body part of the user which can control the displayed object is at least partially out of a field of view of the image capture system; and wherein the at least one action of the object on the display induces user movement of the body part towards a center of the field of view.

4. The method of claim 1 wherein the interactive display object is determined based on a profile of the user including an age of the user such that the interactive display object is an age appropriate response.

5. The method of claim 1 wherein the interactive display object includes no representation of any body part of the user.

6. The method of claim 1 wherein outputting a feedback response to the user comprises outputting an audio indicator to the user indicating a user tracking criteria is not being satisfied.

7. The method of claim 1 wherein outputting a feedback response to the user further comprises changing a visual characteristic of a displayed view of the user.

8. The method of claim 1 wherein the interactive display object is an element of a game.

9. The method of claim 1 further comprising wherein the user tracking criteria is based on a visibility factor of the group consisting of the following:

a location within a capture system's field of view of a body part of the user which can control the displayed object;

lighting;

contrast; and an obstruction of the body part of the user.

10. The method of claim 1 further comprising wherein a user tracking criteria is based on a distinguishability factor which is an audio factor consisting of one of the following:

volume; and distinguishability of speech.

11. A system for providing feedback to a user on an ability of the system to track user action comprising:

an image capture system for capturing image data of a user within a capture area;

one or more processors communicatively coupled to the image capture system and accessible to a memory storing the image data and instructions;

a display communicatively coupled to the one or more processors for displaying feedback to the user;

the one or more processors executing instructions comprising:

executing a first game application of a plurality of applications, the first game application configured to display an application interface using interactive display objects, an interactive display object of the interactive display objects comprising at least one of a virtual ball, a virtual target, a virtual weapon, a virtual opponent and a virtual musical instrument allowing a user to participate in game play, detecting at least one body part of the user in the image data, tracking movement of the at least one body part, the user interacting with the first game application on the system via the capture area, the application responsive to user movement of the at least one body part;

while executing the first game application and responsive to user tracking criteria of at least one body part not being satisfied, determining a rendering of the interactive display object in an application context in a new position moved toward a center of the display such that movement by the user to interact with the interactive display object would reposition the at least one body part in a direction towards a center of the capture area while advancing game play, the interactive display object moving independently of the user; and displaying the interactive display object on the display during game play.

12. The system of claim 11 wherein the one or more processors executing instructions further comprises executing instructions for assisting the user in selecting a capture area by:

displaying instructions to make at least one movement of the at least one body part;

tracking movement of the at least one body part;

responsive to user tracking criteria based on one or more visibility factors being satisfied, determining a tracking quality score based on visibility factors for a test capture area;

responsive to user tracking criteria based on one or more visibility factors not being satisfied;

determining how one or more visibility factors for the image data can be increased to satisfy the user tracking criteria; and displaying feedback to the user identifying at least one change in the capture area to increase a visibility factor.

13. The system of claim 12 wherein the one or more processors executing instructions further comprises executing instructions comprising:

determining a tracking quality score for each of a plurality of test capture areas based on tracking criteria of visibility factors;
identifying the test capture area with a highest score; and
displaying a recommendation of the test capture area with the highest score.

14. The system of claim 12 wherein the one or more visibility factors includes one or more of the following:
a location within a capture system's field of view of at least one body part of the user;
lighting;
contrast; and
an obstruction of at least one body part of the user.

15. The system of claim 11 wherein the display is an off-screen display device.

16. The system of claim 11 wherein the display displays the feedback on a screen of the display.

* * * * *